US011317407B2

(12) United States Patent
Li et al.

(10) Patent No.: US 11,317,407 B2
(45) Date of Patent: Apr. 26, 2022

(54) COMMUNICATION METHOD AND COMMUNICATIONS APPARATUS

(71) Applicant: Huawei Technologies Co., Ltd., Shenzhen (CN)

(72) Inventors: Xinxian Li, Shanghai (CN); Hao Tang, Shanghai (CN); Zhenfei Tang, Ottawa (CA); Fan Wang, Berkshire (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/690,391

(22) Filed: Nov. 21, 2019

(65) Prior Publication Data

US 2020/0120675 A1 Apr. 16, 2020

Related U.S. Application Data

(63) Continuation of application No. PCT/CN2018/091438, filed on Jun. 15, 2018.

(30) Foreign Application Priority Data

Jun. 16, 2017 (CN) .......................... 201710459464.2
Aug. 11, 2017 (CN) .......................... 201710687281.6
Sep. 29, 2017 (CN) .......................... 201710911571.4

(51) Int. Cl.
*H04W 72/02* (2009.01)
*H04W 72/04* (2009.01)

(52) U.S. Cl.
CPC ..... *H04W 72/0453* (2013.01); *H04W 72/042* (2013.01)

(58) Field of Classification Search
CPC ........... H04W 72/0453; H04W 72/042; H04W 72/121; H04W 72/12; H04W 72/1263;
(Continued)

(56) References Cited

U.S. PATENT DOCUMENTS 5,661,804 A * 8/1997 Dykema ............ G07C 9/00182
380/262
5,686,903 A * 11/1997 Duckworth ............ G08C 17/02
340/13.24
(Continued)

FOREIGN PATENT DOCUMENTS

CN 105099634 A 11/2015
CN 105357710 A 2/2016
(Continued)

OTHER PUBLICATIONS

Panasonic,"On default bandwidth part",3GPP TSG-RAN WG1 NR Ad-Hoc#2, R1-1710787, Qingdao, P. R. China Jun. 27-30, 2017, 5 pages.
(Continued)

*Primary Examiner* — Hai V Nguyen
(74) *Attorney, Agent, or Firm* — Slater Matsil, LLP

(57) ABSTRACT

A communication method and a communications apparatus are provided. The method includes: sending, by a network device, indication information to a terminal, where the indication information is used to indicate at least one second BP associated with a first BP; and performing signal transmission, by the network device, with the terminal on the first BP and the at least one second BP. It may be learned that the network device indicates, to the terminal by using the indication information, the at least one second BP associated with the first BP, so that the network device and the terminal can transmit signals on BPs that are associated with each other. In addition, there may be a plurality of second BPs associated with the first BP.

18 Claims, 15 Drawing Sheets

(58) Field of Classification Search
CPC ....... H04W 4/70; H04W 24/08; H04W 24/10; H04W 36/30; H04W 48/10; H04W 48/12; H04W 48/16; H04W 56/0015; H04W 72/02; H04W 72/0406; H04W 72/0413; H04W 72/0446; H04W 72/048; H04W 72/085; H04W 72/1289; H04W 74/006; H04W 74/0833; H04W 76/14; H04W 76/27; H04L 1/0038; H04L 1/0045; H04L 1/0046; H04L 1/0072; H04L 5/001; H04L 5/0053; H04L 5/0048; H04L 5/0055; H04L 5/0094; H04L 27/2647; H04L 47/827; H04L 47/828; H04L 47/829; H04L 2012/5632; H04L 2012/6456
USPC .................................................. 455/509, 516
See application file for complete search history.

(56) References Cited

U.S. PATENT DOCUMENTS

| | | | | |
|---|---|---|---|---|
| 5,699,054 | A * | 12/1997 | Duckworth | G08C 17/02 340/13.24 |
| 5,699,055 | A * | 12/1997 | Dykema | G08C 17/02 340/13.24 |
| 5,854,593 | A * | 12/1998 | Dykema | G07C 9/00857 340/12.23 |
| 7,024,191 | B2 * | 4/2006 | Ofuji | H04W 48/20 455/432.1 |
| 7,817,612 | B2 * | 10/2010 | Morioka | H04W 84/18 370/341 |
| 8,078,112 | B2 * | 12/2011 | Morioka | H04W 84/18 455/63.1 |
| 8,594,000 | B2 * | 11/2013 | Johansson | H04W 72/082 370/282 |
| 8,638,868 | B2 * | 1/2014 | Larsson | H04L 5/0032 375/260 |
| 8,743,811 | B2 * | 6/2014 | Han | H04W 72/02 370/329 |
| 8,976,694 | B2 * | 3/2015 | Feuersanger | H04L 5/0055 370/252 |
| 9,204,450 | B2 * | 12/2015 | Moilanen | H04W 72/0486 |
| 9,247,563 | B2 * | 1/2016 | Anderson | H04L 1/1671 |
| 9,313,078 | B1 * | 4/2016 | Barman | H04L 27/2624 |
| 9,397,813 | B2 * | 7/2016 | Froberg Olsson | H04L 5/0094 |
| 9,402,253 | B2 * | 7/2016 | Yang | H04L 1/1864 |
| 9,497,763 | B2 * | 11/2016 | Feuersaenger | H04L 5/0048 |
| 9,504,029 | B2 * | 11/2016 | Yang | H04L 1/0076 |
| 9,609,651 | B1 * | 3/2017 | Sung | H04W 72/0453 |
| 9,629,148 | B2 * | 4/2017 | Yang | H04W 52/365 |
| 9,648,586 | B2 * | 5/2017 | Han | H04W 74/006 |
| 9,736,648 | B2 * | 8/2017 | Lim | H04L 5/0048 |
| 9,780,929 | B2 * | 10/2017 | Yi | H04W 72/0446 |
| 9,788,307 | B2 * | 10/2017 | Yang | H04L 1/1861 |
| 9,806,804 | B2 * | 10/2017 | Cavaliere | H04L 1/0009 |
| 9,848,414 | B2 * | 12/2017 | Yang | H04L 1/1864 |
| 9,860,051 | B2 * | 1/2018 | Gross | H04L 5/0058 |
| 9,872,244 | B2 * | 1/2018 | Yi | H04W 72/042 |
| 9,930,711 | B2 * | 3/2018 | Kim | H04W 72/02 |
| 9,967,810 | B2 * | 5/2018 | Kim | H04W 72/02 |
| 10,045,329 | B2 * | 8/2018 | Jung | H04W 72/02 |
| 10,070,426 | B2 * | 9/2018 | Yang | H04L 5/0032 |
| 10,104,621 | B2 * | 10/2018 | Ganesan | H04W 52/0261 |
| 10,136,462 | B2 * | 11/2018 | Kim | H04W 74/08 |
| 10,250,372 | B2 * | 4/2019 | Feuersaenger | H04L 5/0096 |
| 10,348,852 | B2 * | 7/2019 | Kim | H04L 67/303 |
| 10,356,593 | B2 * | 7/2019 | Kim | H04W 72/02 |
| 10,475,325 | B2 * | 11/2019 | Schueler | H04W 52/0219 |
| 10,499,334 | B2 * | 12/2019 | Brisebois | H04W 52/0274 |
| 10,517,070 | B2 * | 12/2019 | Seo | H04L 5/0091 |
| 10,673,601 | B2 * | 6/2020 | Chen | H04L 5/0098 |
| 10,674,529 | B2 * | 6/2020 | Lee | H04W 72/02 |
| 10,728,011 | B2 * | 7/2020 | Feuersaenger | H04L 5/0055 |
| 2001/0043619 | A1 | 11/2001 | Boccuzzi et al. | |
| 2003/0032441 | A1 * | 2/2003 | Ofuji | H04W 48/20 455/525 |
| 2006/0251098 | A1 * | 11/2006 | Morioka | H04W 84/18 370/432 |
| 2008/0077255 | A1 * | 3/2008 | Gila | H04Q 9/00 700/13 |
| 2010/0290421 | A1 * | 11/2010 | Morioka | H04W 84/18 370/329 |
| 2012/0020421 | A1 * | 1/2012 | Larsson | H04L 5/0062 375/260 |
| 2012/0026892 | A1 * | 2/2012 | Nakao | H04L 1/1861 370/242 |
| 2013/0021984 | A1 * | 1/2013 | Han | H04W 74/006 370/329 |
| 2013/0039202 | A1 * | 2/2013 | Feuersanger | H04L 5/001 370/252 |
| 2013/0083672 | A1 * | 4/2013 | Johansson | H04W 72/082 370/252 |
| 2013/0163537 | A1 * | 6/2013 | Anderson | H04L 1/1671 370/329 |
| 2013/0294415 | A1 * | 11/2013 | Moilanen | H04W 72/0486 370/331 |
| 2014/0133423 | A1 * | 5/2014 | Froberg Olsson | H04L 5/0053 370/329 |
| 2014/0169241 | A1 | 6/2014 | Sahara | |
| 2014/0226593 | A1 * | 8/2014 | Han | H04W 72/02 370/329 |
| 2014/0241283 | A1 * | 8/2014 | Ohta | H04W 74/006 370/329 |
| 2015/0016350 | A1 * | 1/2015 | Moulsley | H04W 72/0453 370/329 |
| 2015/0103779 | A1 | 4/2015 | Ma et al. | |
| 2015/0156764 | A1 * | 6/2015 | Yang | H04L 1/1864 370/329 |
| 2015/0162980 | A1 * | 6/2015 | Cavaliere | H04L 1/0009 398/26 |
| 2015/0181604 | A1 * | 6/2015 | Feuersaenger | H04W 72/0453 370/329 |
| 2015/0208386 | A1 * | 7/2015 | Yang | H04L 5/001 370/329 |
| 2015/0296516 | A1 * | 10/2015 | Jung | H04W 16/14 370/312 |
| 2015/0365209 | A1 * | 12/2015 | Yi | H04L 5/0044 370/329 |
| 2016/0050534 | A1 * | 2/2016 | Lim | G01S 5/0236 370/252 |
| 2016/0087773 | A1 * | 3/2016 | Nakao | H04L 5/0007 370/329 |
| 2016/0100426 | A1 * | 4/2016 | Fang | H04W 74/004 370/329 |
| 2016/0112946 | A1 * | 4/2016 | Yi | H04W 72/042 370/280 |
| 2016/0218850 | A1 * | 7/2016 | Gross | H04L 5/14 |
| 2016/0249359 | A1 | 8/2016 | Yamazaki et al. | |
| 2016/0269887 | A1 * | 9/2016 | Kim | H04W 8/005 |
| 2016/0278003 | A1 * | 9/2016 | Kim | H04L 5/00 |
| 2016/0309351 | A1 * | 10/2016 | Yang | H04L 1/1861 |
| 2016/0330780 | A1 * | 11/2016 | Kim | H04W 48/16 |
| 2017/0012760 | A1 * | 1/2017 | Feuersaenger | H04L 5/0048 |
| 2017/0019937 | A1 * | 1/2017 | Kim | H04W 76/11 |
| 2017/0041971 | A1 * | 2/2017 | Kim | H04W 72/12 |
| 2017/0135105 | A1 * | 5/2017 | Li | H04W 72/12 |
| 2017/0181097 | A1 * | 6/2017 | Ganesan | H04L 5/0007 |
| 2017/0196005 | A1 * | 7/2017 | Yang | H04L 1/1861 |
| 2017/0289960 | A1 * | 10/2017 | Moustafa | H04J 11/0069 |
| 2017/0318577 | A1 * | 11/2017 | Yang | H04L 5/0055 |
| 2018/0255523 | A1 | 9/2018 | Liu et al. | |
| 2018/0286213 | A1 * | 10/2018 | Schueler | H04W 52/0216 |
| 2018/0295616 | A1 * | 10/2018 | Yang | H04L 1/1671 |
| 2019/0036673 | A1 * | 1/2019 | Chen | H04L 5/001 |
| 2019/0098605 | A1 * | 3/2019 | Seo | H04L 1/1812 |
| 2019/0124674 | A1 * | 4/2019 | Lee | H04W 76/27 |
| 2019/0182017 | A1 * | 6/2019 | Feuersaenger | H04L 5/0048 |
| 2019/0200294 | A1 * | 6/2019 | Brisebois | H04W 52/0229 |
| 2020/0059894 | A1 * | 2/2020 | Siomina | H04W 4/06 |
| 2020/0068443 | A1 * | 2/2020 | Liu | H04W 76/27 |
| 2020/0068548 | A1 * | 2/2020 | Guan | H04W 72/044 |

(56) References Cited

U.S. PATENT DOCUMENTS

| | | | |
|---|---|---|---|
| 2020/0252953 A1* | 8/2020 | Lee | H04W 76/27 |
| 2020/0322117 A1* | 10/2020 | Feuersaenger | H04L 5/0098 |
| 2020/0359228 A1* | 11/2020 | Sirotkin | H04L 5/0039 |
| 2020/0403761 A1* | 12/2020 | Nguyen | H04L 5/001 |
| 2021/0076343 A1* | 3/2021 | Harada | H04W 88/02 |
| 2021/0105729 A1* | 4/2021 | Park | H04W 52/52 |
| 2021/0112563 A1* | 4/2021 | Hua | H04W 72/0446 |
| 2021/0143967 A1* | 5/2021 | Awad | H04L 5/0098 |
| 2021/0167935 A1* | 6/2021 | Li | H04W 24/10 |
| 2021/0176028 A1* | 6/2021 | Zhou | H04W 72/044 |
| 2021/0227524 A1* | 7/2021 | Xu | H04L 5/0053 |
| 2021/0259001 A1* | 8/2021 | Park | H04W 72/1273 |
| 2021/0281369 A1* | 9/2021 | Awad | H04L 5/0037 |
| 2021/0289492 A1* | 9/2021 | Yang | H04L 1/1861 |
| 2021/0289533 A1* | 9/2021 | Sakhnini | H04W 72/1289 |

FOREIGN PATENT DOCUMENTS

| | | |
|---|---|---|
| EP | 0941000 A2 | 9/1999 |
| EP | 1677564 A1 | 7/2006 |
| GB | 2332818 A | 6/1999 |
| WO | 2017075829 A1 | 5/2017 |

OTHER PUBLICATIONS

3GPP TS 38.211 V0.0.0 (May 2017), 3rd Generation Partnership Project; Technical Specification Group Radio Access Network; NR; Physical channels and modulation (Release 15), 10 pages.

Guangdong OPPO Mobile Telecom, "On bandwidth part configuration", 3GPP TSG RAN WG1 meeting #89, R1-1707719, Hangzhou, P.R. China May 15-19, 2017, 3 pages.

3GPP TS 38.331 V0.0.3 (May 2017), 3rd Generation Partnership Project; Technical Specification Group Radio Access Network; NR; Radio Resource Control (RRC); Protocol specification (Release 15), 20 pages.

MediaTek et al, "[Draft] LS on Bandwidth Part Operation in NR", 3GPP TSG-RAN WG1 NR Ad-Hoc#2, R1-1711948, Qingdao, P.R. China, Jun. 27-30, 2017, 3 pages.

Samsung, "Remaining issues on bandwidth part configuration", 3GPP TSG-RAN WG2 NR #100 Meeting, VR2-1713868, Reno, USA, Nov. 27-Dec. 1, 2017, 6 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/091438, filed on Jun. 15, 2018, which claims priority to Chinese Patent Application No. 201710459464.2, filed on Jun. 16, 2017, Chinese Patent Application No. 201710687281.6, filed on Aug. 11, 2017 and Chinese Patent Application No. 201710911571.4, filed on Sep. 29, 2017, all of which are hereby incorporated by reference in their entireties.

TECHNICAL FIELD

This application relates to the field of wireless communication technologies, and in particular, to a communication method and a communications apparatus.

BACKGROUND

In a wireless communications system, a terminal and a network transmit data to each other based on radio communication technologies. However, before the data is transmitted, the terminal usually needs to first access the network, to establish a connection to the network.

Generally, the connection between the terminal and the network may be denoted as a link for short. Two endpoints of a link are respectively used to represent two devices that respectively receive and send data. One endpoint represents a device that enjoys a network service, such as a terminal. The other endpoint represents a device that provides the network service, such as a base station. A connection line between the two endpoints is used to represent a path of data transmission. Links are further classified into an uplink (UL) and a downlink (DL) based on a direction of data transmission.

For data transmission between the terminal and the network, both the uplink and the downlink between the terminal and the network are essential. In addition, to ensure validity and reliability of data transmission, the uplink and the downlink further need to cooperate with each other. For example, in data retransmission, the terminal receives data in the downlink, and if the terminal detects that data transmission fails, the terminal needs to feed back, in the uplink cooperating with the downlink, that a transmission status of the data is "failure", to trigger the base station to retransmit the data. Correspondingly, after sending data in the downlink, the base station also needs to monitor a feedback of the terminal in the uplink cooperating with the downlink. Such cooperation between the uplink and the downlink is usually long-term and fixed, and is also referred to as "paired" or "coupled". In this case, the connection between the terminal and the network may be understood as the paired uplink and downlink.

In a 5G new radio (NR) system under discussion, maximum bandwidth of a carrier may be 400 MHz, but a maximum bandwidth capability supported by the terminal may not reach such wide bandwidth. When the terminal does not support a bandwidth capability of a carrier, the base station cannot directly allocate a resource to the terminal within a range of carrier bandwidth as in a long term evolution (LTE) system, but first configures one or more bandwidth parts (BP) for the terminal on the carrier, and then allocates a resource to the terminal within a range of the BP.

In NR, the base station may configure a plurality of uplink BPs and a plurality of downlink BPs for the terminal. When data transmission needs to be performed, the base station activates some or all of the uplink BPs configured for the terminal, and activates some or all of the downlink BPs configured for the terminal, for data transmission on the activated uplink BPs and downlink BPs.

SUMMARY

This application provides a communication method, to resolve a problem of association between an uplink BP and a downlink BP.

According to a first aspect, this application provides a communication method, and the communication method includes: sending, by a network device, indication information to a terminal, where the indication information is used to indicate at least one second BP associated with a first BP; and performing signal transmission, by the network device, with the terminal on the first BP and the at least one second BP.

In this way, the network device indicates, to the terminal by using the indication information, the at least one second BP associated with the first BP, so that the network device and the terminal can transmit signals on BPs that are associated with each other. In addition, there may be a plurality of second BPs associated with the first BP. This can effectively improve spectrum resource utilization.

In a possible design, the first BP is a downlink BP, and the second BP is an uplink BP; and the sending, by a network device, indication information to a terminal includes: sending, by the network device, the indication information to the terminal on the first BP.

In a possible design, the first BP is a downlink BP, and the second BP is an uplink BP; and the performing signal transmission, by the network device, with the terminal on the first BP and the at least one second BP includes: receiving, by the network device, uplink data that is sent by the terminal on the at least one second BP corresponding to an uplink scheduling grant in the first BP.

In a possible design, the first BP is an uplink BP, and the second BP is a downlink BP; and the performing signal transmission, by the network device, with the terminal on the first BP and the at least one second BP includes: receiving, by the network device on the first BP, at least one piece of HARQ feedback information sent by the terminal, where the HARQ feedback information corresponds to a HARQ of the at least one second BP.

In a possible design, the first BP is a downlink BP, and the second BP is an uplink BP; or the first BP is an uplink BP, and the second BP is a downlink BP.

In a possible design, the first BP and the at least one second BP belong to a same cell.

In a possible design, the method is applied to at least a TDD system and an FDD system.

In a possible design, the first BP is a downlink BP, and the second BP is an uplink BP; and the method further includes: receiving, by the network device, an SRS sent by the terminal on an uplink measurement BP, where the uplink measurement BP is obtained based on the at least one second BP; and obtaining, by the network device, channel quality of the first BP based on the SRS.

According to a second aspect, this application provides a communication method, and the communication method includes: receiving, by a terminal, indication information sent by a network device, where the indication information is used to indicate at least one second BP associated with a first BP; and performing signal transmission, by the terminal, with the network device on the first BP and the at least one second BP.

In a possible design, the first BP is a downlink BP, and the second BP is an uplink BP; and the receiving, by a terminal, indication information sent by a network device includes: receiving, by the terminal on the first BP, the indication information sent by the network device.

In a possible design, the first BP is a downlink BP, and the second BP is an uplink BP; and the performing signal transmission, by the terminal, with the network device on the first BP and the at least one second BP includes: sending, by the terminal, uplink data to the network device on the at least one second BP corresponding to an uplink scheduling grant in the first BP.

In a possible design, the first BP is an uplink BP, and the second BP is a downlink BP; and the performing signal transmission, by the terminal, with the network device on the first BP and the at least one second BP includes: sending, by the terminal on the first BP, at least one piece of HARQ feedback information to the network device, where the HARQ feedback information corresponds to a HARQ of the at least one second BP.

In a possible design, the first BP is a downlink BP, and the second BP is an uplink BP; or the first BP is an uplink BP, and the second BP is a downlink BP.

In a possible design, the first BP and the at least one second BP belong to a same cell.

In a possible design, the method is applied to at least a time division duplex TDD system and a frequency division duplex FDD system.

In a possible design, the first BP is a downlink BP, and the second BP is an uplink BP; and the method further includes: sending, by the terminal, an SRS on an uplink measurement BP, where the uplink measurement BP is obtained based on the at least one second BP.

This application further provides a communication method, and the communication method includes: receiving, by a terminal, configuration information from a network device, where the configuration information is used to configure a first frequency domain resource and a frequency domain resource associated with the first frequency domain resource, the first frequency domain resource and the frequency domain resource associated with the first frequency domain resource have a same center frequency, and the first frequency domain resource and the frequency domain resource associated with the first frequency domain resource are in different transmission directions; and determining, by the terminal based on the configuration information, the first frequency domain resource and the frequency domain resource associated with the first frequency domain resource.

In a possible design, the method further includes: receiving, by the terminal, first instruction information from the network device, where the first instruction information is used to instruct to activate the first frequency domain resource; and activating, by the terminal, the first frequency domain resource according to the first instruction information.

In a possible design, after the receiving, by the terminal, first instruction information from the network device, the method further includes: deactivating, by the terminal, a third frequency domain resource, where the third frequency domain resource and the first frequency domain resource are in a same transmission direction, and the third frequency domain resource and the first frequency domain resource have a same center frequency.

In a possible design, after the receiving, by the terminal, first instruction information from the network device, the method further includes: activating, by the terminal, the frequency domain resource associated with the first frequency domain resource, and deactivating a third frequency domain resource and a fourth frequency domain resource; where the third frequency domain resource and the first frequency domain resource are in a same transmission direction, and the third frequency domain resource and the first frequency domain resource have different center frequencies; and the third frequency domain resource and the fourth frequency domain resource are in different transmission directions, and the third frequency domain resource and the fourth frequency domain resource have a same center frequency.

In a possible design, a plurality of frequency domain resources are associated with the first frequency domain resource; and the activating, by the terminal, the frequency domain resource associated with the first frequency domain resource includes: receiving, by the terminal, second instruction information sent by the network device, where the second instruction information is used to instruct to activate a second frequency domain resource, and the second frequency domain resource is any one of the frequency domain resources associated with the first frequency domain resource; and activating, by the terminal, the second frequency domain resource according to the second instruction information.

In a possible design, the method further includes: activating, by the terminal based on the configuration information, the first frequency domain resource and the frequency domain resource associated with the first frequency domain resource.

This application further provides a communication method, and the method includes: generating, by a network device, configuration information; and sending, by the network device, the configuration information to a terminal, where the configuration information is used to configure a first frequency domain resource and a frequency domain resource associated with the first frequency domain resource, the first frequency domain resource and the frequency domain resource associated with the first frequency domain resource have a same center frequency, and the first frequency domain resource and the frequency domain resource associated with the first frequency domain resource are in different transmission directions.

In a possible design, the method further includes: sending, by the network device, first instruction information to the terminal, where the first instruction information is used to instruct to activate the first frequency domain resource.

In a possible design, a plurality of frequency domain resources are associated with the first frequency domain resource; and the method further includes: sending, by the network device, second instruction information to the terminal, where the second instruction information is used to instruct to activate a second frequency domain resource, and the second frequency domain resource is any one of the frequency domain resources associated with the first frequency domain resource.

This application further provides a communication method, and the communication method includes: receiving, by a terminal, configuration information from a network device, where the configuration information is used to configure at least one frequency domain resource and a frequency domain resource associated with any frequency domain resource in the at least one frequency domain resource, the any frequency domain resource and the frequency domain resource associated with the any frequency domain resource have a same center frequency, and the any frequency domain resource and the frequency domain resource associated with the any frequency domain resource are in different transmission directions; and determining, by the terminal based on the configuration information, the at least one frequency domain resource and the frequency domain resource associated with the any frequency domain resource in the at least one frequency domain resource.

In a possible design, the method further includes: receiving, by the terminal, first instruction information from the network device, where the first instruction information is used to instruct to activate a first frequency domain resource, and the first frequency domain resource is any one of the at least one frequency domain resource; and activating, by the terminal, the first frequency domain resource according to the first instruction information.

In a possible design, after the receiving, by the terminal, first instruction information from the network device, the method further includes: deactivating, by the terminal, a third frequency domain resource, where the third frequency domain resource and the first frequency domain resource are in a same transmission direction, and the third frequency domain resource and the first frequency domain resource have a same center frequency.

In a possible design, after the receiving, by the terminal, first instruction information from the network device, the method further includes: activating, by the terminal, a frequency domain resource associated with the first frequency domain resource, and deactivating a third frequency domain resource and a fourth frequency domain resource; where the third frequency domain resource and the first frequency domain resource are in a same transmission direction, and the third frequency domain resource and the first frequency domain resource have different center frequencies; and the third frequency domain resource and the fourth frequency domain resource are in different transmission directions, and the third frequency domain resource and the fourth frequency domain resource have a same center frequency.

In a possible design, a plurality of frequency domain resources are associated with the first frequency domain resource; and the activating, by the terminal, a frequency domain resource associated with the first frequency domain resource includes: receiving, by the terminal, second instruction information sent by the network device, where the second instruction information is used to instruct to activate a second frequency domain resource, and the second frequency domain resource is any one of the frequency domain resources associated with the first frequency domain resource; and activating, by the terminal, the second frequency domain resource according to the second instruction information.

In a possible design, the method further includes: activating, by the terminal based on the configuration information, the first frequency domain resource and the frequency domain resource associated with the first frequency domain resource, where the first frequency domain resource is any one of the at least one frequency domain resource.

This application further provides a communication method, and the method includes: generating, by a network device, configuration information; and sending, by the network device, the configuration information to a terminal, where the configuration information is used to configure at least one frequency domain resource and a frequency domain resource associated with any frequency domain resource in the at least one frequency domain resource, the any frequency domain resource and the frequency domain resource associated with the any frequency domain resource have a same center frequency, and the any frequency domain resource and the frequency domain resource associated with the any frequency domain resource are in different transmission directions.

In a possible design, the method further includes: sending, by the network device, first instruction information to the terminal, where the first instruction information is used to instruct to activate the first frequency domain resource, and the first frequency domain resource is any one of the at least one frequency domain resource.

In a possible design, a plurality of frequency domain resources are associated with the first frequency domain resource; and the method further includes: sending, by the network device, second instruction information to the terminal, where the second instruction information is used to instruct to activate a second frequency domain resource, and the second frequency domain resource is any one of the frequency domain resources associated with the first frequency domain resource.

This application further provides a communication method, and the method includes: receiving, by a terminal, third instruction information from a network device, where the third instruction information is used to instruct to activate a first frequency domain resource pair, and the first frequency domain resource pair includes an uplink frequency domain resource and a downlink frequency domain resource that are associated with each other; and activating, by the terminal, the first frequency domain resource pair according to the third instruction information.

In a possible design, before the receiving, by a terminal, third instruction information from a network device, the method further includes: receiving, by the terminal, configuration information from the network device, where the configuration information is used to configure at least one frequency domain resource pair, and the first frequency domain resource pair is any one or more of the at least one frequency domain resource pair; and determining, by the terminal, the at least one frequency domain resource pair based on the configuration information.

In a possible design, after the receiving, by a terminal, third instruction information from a network device, the method further includes: deactivating, by the terminal, a second frequency domain resource pair, where the second frequency domain resource pair is an activated frequency domain resource pair in the at least one frequency domain resource pair except the first frequency domain resource pair.

In a possible design, the third instruction information includes an identifier of the first frequency domain resource pair.

In a possible design, the frequency domain resources in the first frequency domain resource pair have a same center frequency.

This application further provides a communication method, and the method includes: generating, by a network device, third instruction information, where the third instruction information is used to instruct to activate a first frequency domain resource pair, and the first frequency domain resource pair includes an uplink frequency domain resource and a downlink frequency domain resource that are associated with each other; and sending, by the network device, the third instruction information to a terminal.

In a possible design, the method further includes: sending, by the network device, configuration information to the terminal, where the configuration information is used to configure at least one frequency domain resource pair, and the first frequency domain resource pair is any one or more of the at least one frequency domain resource pair.

In a possible design, the third instruction information includes an identifier of the first frequency domain resource pair.

In a possible design, the frequency domain resources in the first frequency domain resource pair have a same center frequency.

According to a third aspect, this application provides a communications apparatus, where the communications apparatus may be a network device, or may be a chip in the network device, and the communications apparatus has functions of implementing the method example in the first aspect. The functions may be implemented by hardware, or may be implemented by hardware executing corresponding software. The hardware or the software includes one or more modules corresponding to the functions.

In a possible design, a structure of the communications apparatus includes a sending module, a receiving module, and a processing module. These modules may perform corresponding functions in the example of the first aspect, specifically including: sending indication information to a terminal, where the indication information is used to indicate at least one second BP associated with a first BP; and performing signal transmission with the terminal on the first BP and the at least one second BP.

According to a fourth aspect, this application provides a communications apparatus, where the communications apparatus may be a terminal, or may be a chip in the terminal, and the communications apparatus has functions of implementing the method example in the second aspect. The functions may be implemented by hardware, or may be implemented by hardware executing corresponding software. The hardware or the software includes one or more modules corresponding to the functions.

In a possible design, a structure of the communications apparatus includes a sending module, a receiving module, and a processing module. These modules may perform corresponding functions in the example of the second aspect, specifically including: receiving indication information sent by a network device, where the indication information is used to indicate at least one second BP associated with a first BP; and performing signal transmission with the network device on the first BP and the at least one second BP.

This application provides a communications apparatus, where the communications apparatus may be a terminal, or may be a chip in the terminal, and the communications apparatus has functions of implementing the method example. The functions may be implemented by hardware, or may be implemented by hardware executing corresponding software. The hardware or the software includes one or more modules corresponding to the functions.

In a possible design, a structure of the communications apparatus includes a sending module, a receiving module, and a processing module. These modules may perform corresponding functions in the method example, specifically including: receiving third instruction information from a network device, where the third instruction information is used to instruct to activate a first frequency domain resource pair, and the first frequency domain resource pair includes an uplink frequency domain resource and a downlink frequency domain resource that are associated with each other; and activating the first frequency domain resource pair according to the third instruction information.

This application further provides a communications apparatus, where the communications apparatus may be a network device, or may be a chip in the network device, and the communications apparatus has functions of implementing the method example. The functions may be implemented by hardware, or may be implemented by hardware executing corresponding software. The hardware or the software includes one or more modules corresponding to the functions.

In a possible design, a structure of the communications apparatus includes a sending module, a receiving module, and a processing module. These modules may perform corresponding functions in the method example, specifically including: generating third instruction information, where the third instruction information is used to instruct to activate a first frequency domain resource pair, and the first frequency domain resource pair includes an uplink frequency domain resource and a downlink frequency domain resource that are associated with each other; and sending the third instruction information to a terminal.

According to a fifth aspect, this application provides a communications apparatus, where the communications apparatus may be a network device, or may be a chip in the network device, the communications apparatus has functions of implementing the method example in the first aspect, and the communications apparatus includes a communications module and a processor.

The communications module is configured to communicate and interact with another device, specifically, is configured to: send indication information to a terminal, where the indication information is used to indicate at least one second BP associated with a first BP; and perform signal transmission with the terminal on the first BP and the at least one second BP.

The communications module may be an RF circuit, a Wi-Fi module, a communications interface, a Bluetooth module, or the like.

The processor is configured to implement a function of the processing module in the third aspect, for example, including: determining the indication information.

Optionally, the communications apparatus may further include the memory, configured to store a program and the like. Specifically, the program may include program code, and the program code includes an instruction. The memory may include a RAM, and may further include a non-transitory storage (e.g., non-transitory memory), for example, at least one magnetic disk memory. The processor executes the application program stored in the memory, to implement the foregoing function.

In a possible manner, the communications module, the processor, and the memory may be interconnected by using the bus. The bus may be a peripheral component interconnect (PCI) bus, an extended industry standard architecture (EISA) bus, or the like. The bus may be classified into an address bus, a data bus, a control bus, and the like.

According to a sixth aspect, this application provides a communications apparatus, where the communications apparatus may be a network device, or may be a chip in the network device, the communications apparatus has functions of implementing the method example in the second aspect, and the communications apparatus includes a communications module.

The communications module is configured to communicate and interact with another device, specifically, is configured to: receive indication information sent by a network device, where the indication information is used to indicate at least one second BP associated with a first BP; and perform signal transmission with the network device on the first BP and the at least one second BP.

The communications module may be an RF circuit, a Wi-Fi module, a communications interface, a Bluetooth module, or the like.

The processor is configured to implement a function of the processing module in the fourth aspect, for example, including: parsing the indication information.

Optionally, the communications apparatus may further include the memory, configured to store a program and the like. Specifically, the program may include program code, and the program code includes an instruction. The memory may include a RAM, and may further include a non-transitory storage (non-transitory memory), for example, at least one magnetic disk memory. The processor executes the application program stored in the memory, to implement the foregoing function.

In a possible manner, the communications module, the processor, and the memory may be interconnected by using the bus. The bus may be a peripheral component interconnect (PCI) bus, an extended industry standard architecture (EISA) bus, or the like. The bus may be classified into an address bus, a data bus, a control bus, and the like.

This application further provides a computer-readable storage medium. The storage medium stores an instruction, and when the instruction is run on a computer, the computer is enabled to perform the communication method provided in any one of the foregoing designs.

This application further provides a computer program product including an instruction. When the instruction is run on a computer, the computer is enabled to perform the communication method provided in any one of the foregoing designs.

This application further provides a computer program. When the computer program is run on a computer, the computer is enabled to perform the communication method provided in any one of the foregoing designs.

DETAILED DESCRIPTION OF ILLUSTRATIVE EMBODIMENTS

The following describes this application in detail with reference to the accompanying drawings in the specification.

Figure 1:
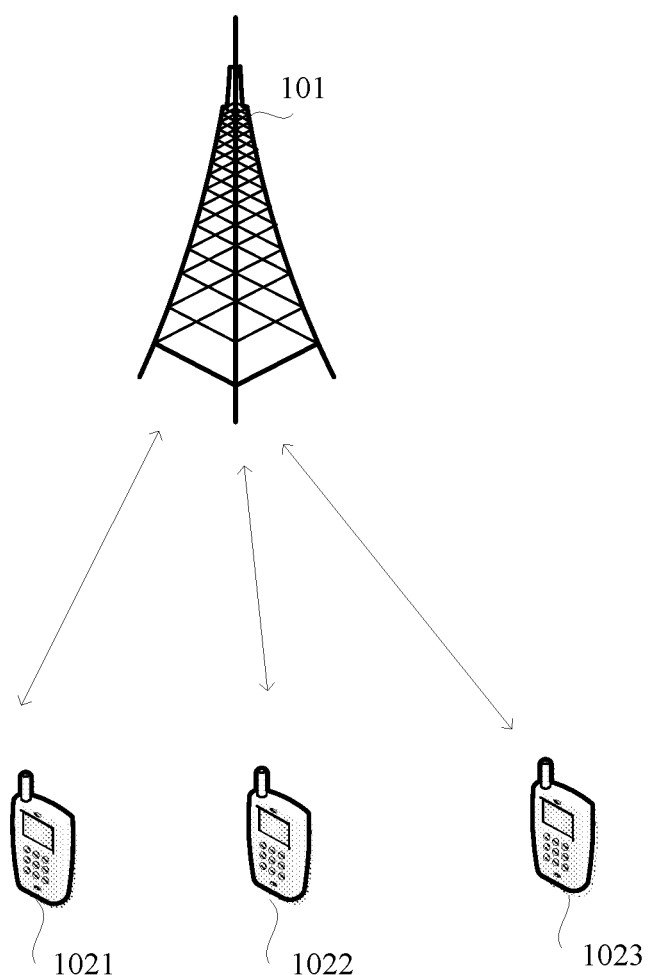
FIG. 1 is a schematic diagram of a system architecture to which this application is applicable.

A communication method in this application can be applied to a plurality of system architectures. FIG. 1 is a schematic diagram of a system architecture to which this application is applicable. As shown in FIG. 1, the system architecture includes a network device 101 and one or more terminals, such as a first terminal 1021, a second terminal 1022, and a third terminal 1023 shown in FIG. 1. The network device 101 may communicate with any one of the first terminal 1021, the second terminal 1022, and the third terminal 1023 through a network.

In this application, the network device may be a base station (BS) device. The base station device may also be referred to as a base station, and is a device in an access network that communicates with a wireless terminal over an air interface by using one or more sectors. For example, a device that provides a base station function in a long term evolution (LTE) system is an evolved NodeB. A device that provides a base station function in an NR system includes one or more of the following: a new radio NodeB (gNB), a centralized unit (CU), and a distributed unit. A device that provides a base station function in a wireless local area network (WLAN) is an access point (AP).

The terminal may be a wireless terminal or a wired terminal. The wireless terminal may be a device that provides voice and/or data connectivity for a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone), or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (Subscriber Station, SS), a mobile station (MB), a mobile console (also referred to as Mobile), a remote station (Remote Station, RS), an access point (AP), a remote terminal (RT), an access terminal (AT), a user terminal (UT), a user agent (UA), a user device (UD), or user equipment (UE).

During multi-carrier aggregation in the current system, a terminal uses an accessed downlink carrier as a primary carrier, and then adds a secondary carrier by using radio resource control (RRC) signaling. For TDD, when a downlink carrier is added, a frequency domain location of a corresponding uplink carrier is the same as a frequency domain location of the downlink carrier. For FDD, when a downlink carrier is added, a corresponding uplink carrier is configured by using signaling. It may be learned that in the current system, each uplink carrier is paired with one downlink carrier, so that during data transmission, the uplink carrier and the downlink carrier that are paired may be associated with each other.

In the NR system, a network device configures uplink BPs and downlink BPs for a terminal. When data transmission needs to be performed, the base station activates some or all of the uplink BPs configured for the terminal, and activates some or all of the downlink BPs configured for the terminal, for data transmission on at least one activated uplink BP and at least one activated downlink BP.

Embodiment 1

Embodiment 1 of this application provides a communication method, to resolve a problem of association between an uplink BP and a downlink BP. The method includes: A network device sends indication information to a terminal, where the indication information is used to indicate at least one second BP associated with a first BP; correspondingly, the terminal receives the indication information sent by the network device; and the network device performs signal transmission with the terminal on the first BP and the at least one second BP.

The network device may send the indication information to the terminal in a plurality of implementations. For example, the indication information is carried by signaling or a message. For example, the network device may send the indication information by using radio resource control (RRC) signaling, downlink control information (DCI), or a media access control control element (MAC CE). The indication information may include information that uniquely identifies an uplink BP.

In this application, the indication information may be used to indicate a correspondence between an uplink BP and a downlink BP and/or activation of an uplink BP and a downlink BP.

That the uplink BP and the downlink BP correspond to each other in this application is equivalent to that the uplink BP and the downlink BP are associated with each other or cooperate with each other.

In this application, in a first possible implementation, the first BP is a downlink BP, and the second BP is an uplink BP; or the first BP is an uplink BP, and the second BP is a downlink BP. The network device may send the indication information to the terminal on a common bandwidth part (common BP). In this case, the indication information is used to indicate the correspondence between an uplink BP and a downlink BP and/or activation of the uplink BP and the downlink BP.

In a second possible implementation, the first BP is a downlink BP, the second BP is an uplink BP, and the network device may send the indication information to the terminal on the first BP. In this case, the indication information is used to indicate the uplink BP, and the uplink BP indicated by the indication information is an uplink BP associated with the first BP.

Figure 2:
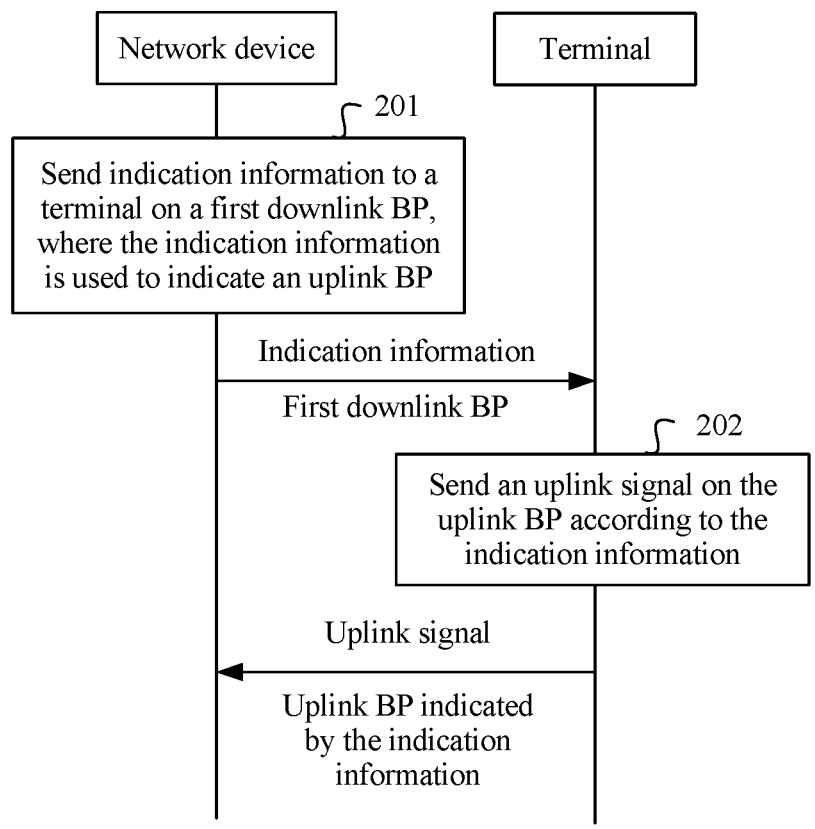
FIG. 2 is a schematic flowchart corresponding to a communication method according to Embodiment 1 of this application.

The second possible implementation is described in detail below with reference to FIG. 2. As shown in FIG. 2, the method includes the following steps.

Step 201: Send the indication information to the terminal on a first downlink bandwidth part BP, where the indication information is used to indicate an uplink BP.

Herein, the first downlink BP is any one of downlink BPs activated by the network device for the terminal.

The uplink BP indicated by the indication information is any one of uplink BPs activated by the terminal device, and the uplink BP is an uplink BP associated with the first downlink BP.

Correspondingly, the terminal device receives, on the first downlink BP, the indication information sent by the network device.

After receiving the indication information, the terminal device may determine, by parsing the indication information, the uplink BP indicated by the indication information.

Step 202: Send an uplink signal on the uplink BP according to the indication information.

Herein, the terminal device determines the uplink BP indicated by the indication information, and may send the uplink signal on the uplink BP. The uplink signal may be a sounding reference signal (SRS), or may be either or any combination of uplink scheduling data transmitted on a physical uplink shared channel (PUSCH) and a hybrid automatic repeat request acknowledgement (HARQ ACK) transmitted on a physical uplink control channel (PUCCH).

Correspondingly, the network device side receives the uplink signal sent by the terminal on the uplink BP.

It should be noted that step 201 may be implemented by the network device or a chip in the network device. Step 202 may be implemented by a communications apparatus, and the communications apparatus may be the terminal, or may be a chip in the terminal. It may be understood that when the communications apparatus is the chip in the terminal, before the chip receives or sends information, the information may be processed by another module in the terminal, such as frequency conversion processing of a radio frequency module. This is not limited in this embodiment of this application.

Figure 3:
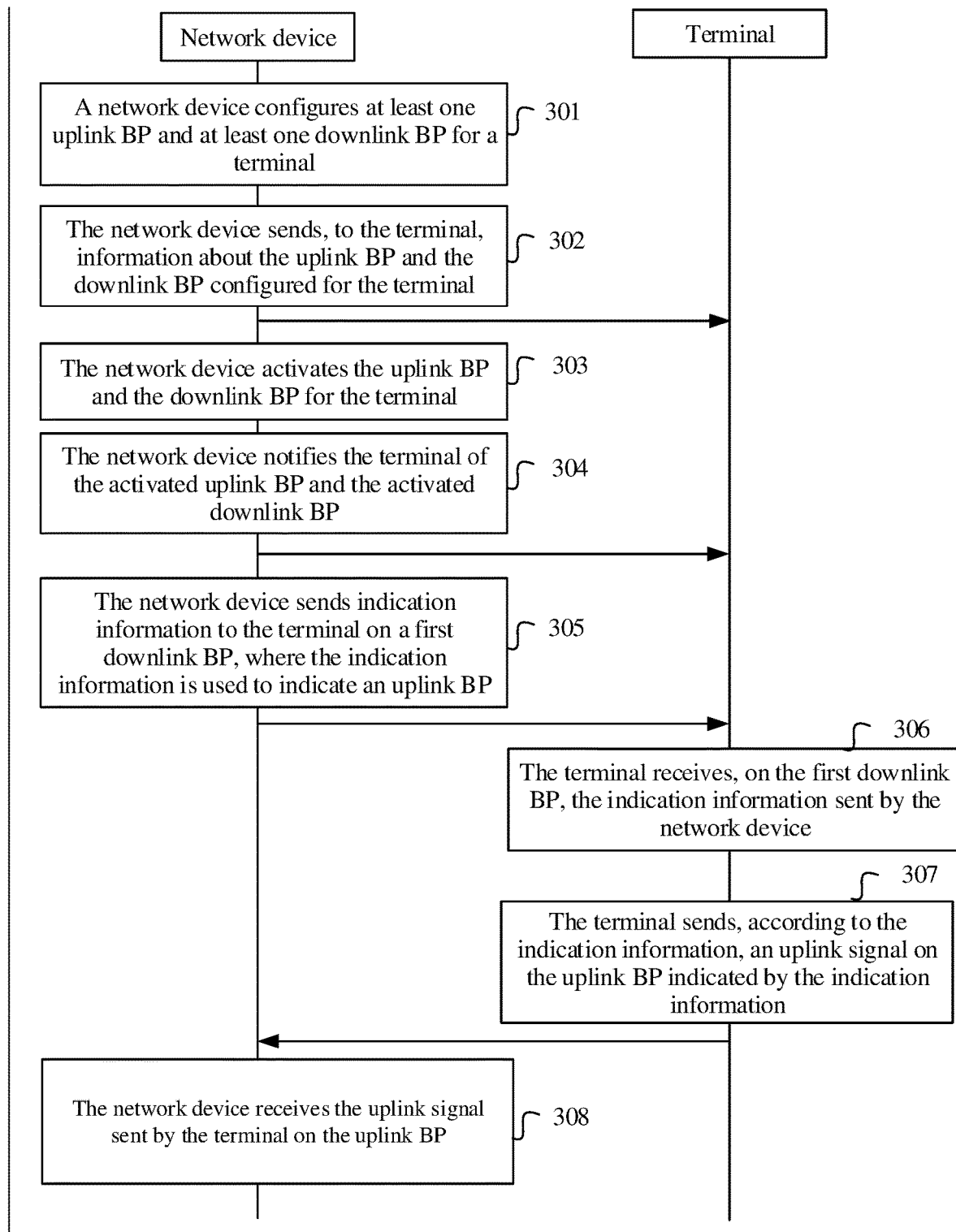
FIG. 3 is a schematic diagram of an entire procedure of a communication method according to this application.

FIG. 3 is a schematic diagram of an entire procedure of a communication method according to this application. The communication method in this application is described in detail below with reference to FIG. 3. As shown in FIG. 3, the method includes the following steps.

Step 301: A network device obtains a maximum bandwidth capability supported by a terminal, and configures at least one uplink BP and at least one downlink BP for the terminal based on the maximum bandwidth capability supported by the terminal.

Specifically, the network device may obtain, in a plurality of manners, the maximum bandwidth capability supported by the terminal. For example, the network device may obtain, based on information reported by the terminal, the maximum bandwidth capability supported by the terminal.

When the network device configures the uplink BP and the downlink BP for the terminal based on the maximum bandwidth capability supported by the terminal, to save energy and support a plurality of subcarrier spacings, bandwidth of the uplink BP and the downlink BP configured by the network device for the terminal is usually less than or equal to the maximum bandwidth capability supported by the terminal. For example, the maximum bandwidth capability supported by the terminal may be 100 MHz, and the bandwidth of each of the uplink BP and the downlink BP configured by the network device for the terminal is less than or equal to 100 MHz, for example, may be 10 MHz or 20 MHz.

The at least one uplink BP configured by the network device for the terminal may have same bandwidth or different bandwidth. Similarly, the at least one downlink BP configured by the network device for the terminal may have same bandwidth or different bandwidth. Further, a bandwidth relationship between the uplink BP and the downlink BP that are configured by the network device side for the terminal is not limited in this application.

Step 302: The network device sends, to the terminal, information about the uplink BP and the downlink BP configured for the terminal.

Specifically, the network device may send, to the terminal by using signaling such as RRC signaling, the information about the uplink BP and the downlink BP configured for the terminal. The information about the uplink BP and the downlink BP includes bandwidth, frequency domain locations, and subcarrier spacings of the uplink BP and the downlink BP. In this application, a BP may be uniquely determined based on bandwidth, a frequency domain location, and a subcarrier spacing of the BP, and the frequency domain location of the BP may be a lowest frequency domain location, a center frequency domain location, or a highest frequency domain location of the BP. This is not specifically limited.

In a possible implementation, after configuring the uplink BP and the downlink BP for the terminal, the network device may number the uplink BP and the downlink BP. In this case, in step 302, the information that is about the uplink BP and the downlink BP and that is sent by the network device to the terminal may include the bandwidth, the frequency domain locations, the subcarrier spacings, numbers, and the like of the uplink BP and the downlink BP.

In this application, the uplink BP and the downlink BP are specifically numbered in a plurality of manners. Possible numbering manners are described below by using an example in which the network device configures three uplink BPs and three downlink BPs for the terminal (subcarrier spacings of two of the three uplink BPs are 15 kHz, and a subcarrier spacing of the other uplink BP is 30 kHz; and subcarrier spacings of two of the three downlink BPs are 15 kHz, and a subcarrier spacing of the other downlink BP is 30 kHz).

Manner 1: The uplink BPs and the downlink BPs are numbered together. In this manner, the uplink BPs and the downlink BPs are not distinguished.

Figure 4A:
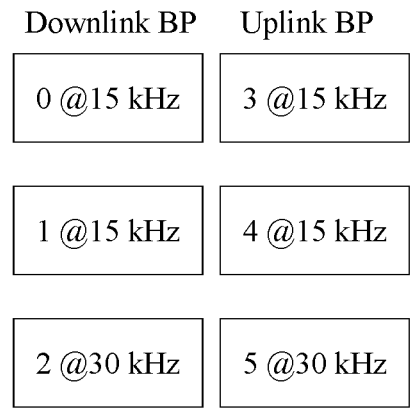
FIG. 4*a* is a schematic diagram of a first possible numbering manner corresponding to Manner 1.

FIG. 4a is a schematic diagram of a first possible numbering manner corresponding to Manner 1. As shown in FIG. 4a, the uplink BPs and the downlink BPs configured by the network device for the terminal are respectively numbered 0, 1, 2, 3, 4, and 5.

In the numbering manner in FIG. 4a, information that is about the uplink BPs and the downlink BPs and that is sent by the network device to the terminal may include bandwidth, frequency domain locations, subcarrier spacings, and numbers of the uplink BPs and the downlink BPs.

Figure 4B:
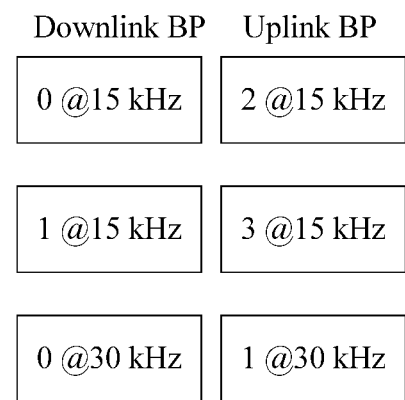
FIG. 4*b* is a schematic diagram of a second possible numbering manner corresponding to Manner 1.

Considering that the uplink BPs and the downlink BPs configured by the network device for the terminal have different subcarrier spacings, to make bandwidth parts with a same subcarrier spacing correspond to each other, a BP may be numbered based on a subcarrier spacing of the BP, for example, BPs with a same subcarrier spacing are numbered together, and BPs with different subcarrier spacings are independently numbered. FIG. 4b is a schematic diagram of a second possible numbering manner corresponding to Manner 1. As shown in FIG. 4b, BPs whose subcarrier spacings are 15 kHz in the uplink BPs and the downlink BPs configured by the network device for the terminal are numbered 0, 1, 2, and 3, and BPs whose subcarrier spacings are 30 kHz are numbered 0 and 1.

In the numbering manner in FIG. 4b, information that is about the uplink BPs and the downlink BPs and that is sent by the network device to the terminal may include bandwidth, frequency domain locations, numbers, and subcarrier spacings of the uplink BPs and the downlink BPs.

Manner 2: The uplink BPs and the downlink BPs are independently numbered. In this manner, the uplink BPs and the downlink BPs are distinguished.

Figure 4C:
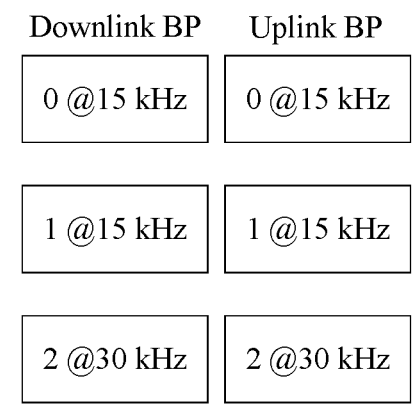
FIG. 4*c* is a schematic diagram of a first possible numbering manner corresponding to Manner 2.

FIG. 4c is a schematic diagram of a first possible numbering manner corresponding to Manner 2. As shown in FIG. 4c, the uplink BPs configured by the network device for the terminal are respectively numbered 0, 1, 2, and the downlink BPs are respectively numbered 0, 1, and 2.

In the numbering manner in FIG. 4c, information that is about the uplink BPs and the downlink BPs and that is sent by the network device to the terminal may include bandwidth, frequency domain locations, numbers, subcarrier spacings, and uplink/downlink identifiers of the uplink BPs and the downlink BPs. The uplink/downlink identifier is used to identify that the BP is an uplink BP or a downlink BP, and the uplink/downlink identifier may be represented in a plurality of forms, for example, may be represented by bits 0 and 1, where 0 represents uplink, and 1 represents downlink.

Figure 4D:
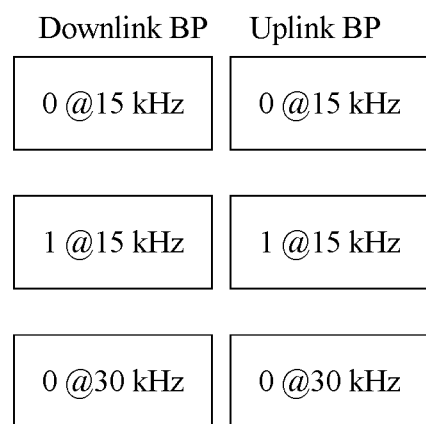
FIG. 4*d* is a schematic diagram of a second possible numbering manner corresponding to Manner 2.

FIG. 4d is a schematic diagram of a second possible numbering manner corresponding to Manner 2. As shown in FIG. 4d, BPs whose subcarrier spacings are 15 kHz in the uplink BPs configured by the network device for the terminal are numbered 0 and 1, and BPs whose subcarrier spacings are 30 kHz are numbered 0; and BPs whose subcarrier spacings are 15 kHz in the downlink BPs configured by the network device for the terminal are numbered 0 and 1, and BPs whose subcarrier spacings are 30 kHz are numbered 0.

In the numbering manner in FIG. 4d, information that is about the uplink BPs and the downlink BPs and that is sent by the network device to the terminal may include bandwidth, frequency domain locations, numbers, uplink/downlink identifiers, and subcarrier spacings of the uplink BPs and the downlink BPs.

In another possible implementation, after configuring the uplink BP and the downlink BP for the terminal, the network device may number resource blocks (Resource Block, RB) of the uplink BP and the downlink BP. In this case, in step 302, the information that is about the uplink BP and the downlink BP and that is sent by the network device to the terminal may include frequency domain locations, subcarrier spacings, and RB quantities of the uplink BP and the downlink BP.

Step 303: The network device activates the uplink BP and the downlink BP for the terminal, where one or more uplink BPs and one or more downlink BPs are activated.

Herein, a trigger condition of activating, by the network device, the uplink BP and the downlink BP for the terminal may be that the network device determines to perform data transmission with the terminal, or may be another case. This is not specifically limited.

In this application, RBs of the activated uplink BP and the activated downlink BP are numbered in a plurality of manners. Possible numbering manners are described below by using an example in which the network device activates two uplink BPs (each uplink BP has 180 RBs) and two downlink BPs for the terminal.

Manner 1: RBs of the uplink BPs and the downlink BPs are numbered together.

In this case, RBs of the two uplink BPs and the two downlink BPs activated by the network device for the terminal are numbered 0 to 719.

Manner 2: RBs of each BP are numbered independently.

In this case, RBs of each of the two uplink BPs and the two downlink BPs activated by the network device for the terminal are numbered 0 to 179.

Manner 3: RBs of the uplink BPs are numbered together, and RBs of the downlink BPs are numbered together.

In this case, RBs of each of the two uplink BPs and the two downlink BPs activated by the network device for the terminal are numbered 0 to 359.

Step 304: The network device notifies the terminal of the activated uplink BP and the activated downlink BP.

Specifically, if the network device uses the numbering manner shown in FIG. 4a, in step 304, the network device may send the number of the activated uplink BP and the number of the activated downlink BP to the terminal, and the terminal may determine the activated BPs based on the numbers of the BPs. If the network device uses the numbering manner shown in FIG. 4b, in step 304, the network device may send the numbers and the subcarrier spacings of the activated uplink BP and the activated downlink BP to the terminal, and the terminal may determine the activated BPs based on the numbers and the subcarrier spacings of the BPs. Other manners are similar to the foregoing manners, and details are not described again.

Step 305: The network device sends indication information to the terminal on a first downlink BP, where the indication information is used to indicate an uplink BP.

The uplink BP indicated by the indication information is an uplink BP corresponding to the first downlink BP, and may specifically include a first uplink BP corresponding to an uplink scheduling grant (UL grant) in the first downlink BP and/or a second uplink BP corresponding to a HARQ ACK of downlink data in the first downlink BP. The first uplink BP and the second uplink BP may be a same uplink BP, or may be different uplink BPs.

In a first possible scenario, the network device activates one (for example, an uplink BP 1) of the uplink BPs configured for the terminal, and activates one (for example, a downlink BP 1) of the downlink BPs configured for the terminal. In this case, the uplink BP 1 and the downlink BP 1 may be associated with each other, to implement data transmission.

For this scenario, in a possible implementation, the network device indicates, to the terminal by using the indication information, that an uplink BP corresponding to the downlink BP 1 is the uplink BP 1. In this scenario, because only the uplink BP 1 and the downlink BP 1 are activated, the terminal may consider by default that the uplink BP 1 and the downlink BP 1 correspond to each other. Therefore, in another possible implementation, the network device does not need to indicate, to the terminal by using the indication information, an uplink BP corresponding to the downlink BP 1, thereby reducing signaling overheads.

In a second possible scenario, the network device activates a plurality of uplink BPs (for example, an uplink BP 1 and an uplink BP 2) in the uplink BPs configured for the terminal, and activates one (for example, a downlink BP 1) of the downlink BPs configured for the terminal.

For this scenario, in a possible implementation, the network device indicates, to the terminal by using the indication information, an uplink BP (for example, the uplink BP 1) corresponding to an uplink scheduling grant in the downlink BP 1 and an uplink BP (for example, the uplink BP 2) corresponding to a HARQ of downlink data in the downlink BP 1. In this scenario, only the downlink BP 1 is activated, and each HARQ ACK of downlink data received by the network device is a HARQ ACK of the downlink data in the downlink BP 1. Therefore, in another possible implementation, the network device indicates, to the terminal by using the indication information, only an uplink BP corresponding to an uplink scheduling grant in the downlink BP 1, but does not need to indicate an uplink BP corresponding to a HARQ of downlink data in the downlink BP 1, in other words, the uplink BP indicated by the indication information includes only the uplink BP corresponding to the uplink scheduling grant in the downlink BP 1.

In a third possible scenario, the network device activates one (for example, an uplink BP 1) of the uplink BPs configured for the terminal, and activates a plurality of downlink BPs (for example, a downlink BP 1 and a downlink BP 2) in the downlink BPs configured for the terminal.

For this scenario, the downlink BP 1 is used as an example. The network device indicates, to the terminal by using the indication information, that an uplink BP corresponding to an uplink scheduling grant in the downlink BP 1 is the uplink BP 1, and an uplink BP corresponding to a HARQ ACK of downlink data in the downlink BP 1 is the uplink BP 1. In this scenario, only the downlink BP 1 is activated, and the terminal may send uplink scheduling data on the uplink BP 1 by default. Therefore, the network device may not need to indicate, to the terminal by using the indication information, the uplink BP corresponding to the uplink scheduling grant in the downlink BP 1. All HARQ ACKs of the plurality of activated downlink BPs may be fed back on a same uplink BP.

In a fourth possible scenario, the network device activates a plurality of uplink BPs (for example, an uplink BP 1 and an uplink BP 2) in the uplink BPs configured for the terminal, and activates a plurality of downlink BPs (for example, a downlink BP 1 and a downlink BP 2) in the downlink BPs configured for the terminal.

In this scenario, a plurality of uplink BPs and a plurality of downlink BPs are activated. Therefore, using the downlink BP 1 as an example, the network device needs to indicate, to the terminal by using the indication information, an uplink BP (for example, the uplink BP 1) corresponding to an uplink scheduling grant in the downlink BP 1 and an uplink BP (for example, the uplink BP 2) corresponding to a HARQ ACK of downlink data in the downlink BP 1, in other words, uplink BPs indicated by the indication information include the uplink BP corresponding to the uplink scheduling grant in the downlink BP 1 and the uplink BP corresponding to the HARQ of the downlink data in the downlink BP 1.

Optionally, in this application, the uplink BP corresponding to the uplink scheduling grant in the downlink BP and the uplink BP corresponding to the HARQ ACK of the downlink data may be predefined as a same uplink BP.

In this application, in a possible implementation, the indication information may include information that uniquely identifies the uplink BP. Specifically, if the network device uses the numbering manner shown in FIG. 4a, the indication information may include a number of a BP, and the terminal may determine, based on the number of the BP, an uplink BP corresponding to the number. If the network device uses the numbering manner shown in FIG. 4b, the indication information may include a number and a subcarrier spacing of a BP, and the terminal may determine, based on the number and the subcarrier spacing of the BP, an uplink BP corresponding to the number and the subcarrier spacing. Other manners are similar to the foregoing manners, and details are not described again.

Optionally, in this application, the network device may indicate, in an implicit manner, the uplink BP corresponding to the uplink scheduling grant in the downlink BP. Specifically, when RBs of a plurality of uplink BPs with a same subcarrier spacing are numbered together, the terminal device may determine, based on a number of an uplink resource allocated in the uplink scheduling grant, the uplink BP corresponding to the uplink scheduling grant. For example, the network device activates two uplink BPs: the uplink BP 1 and the uplink BP 2. RBs of the uplink BP 1 are numbered 0 to 20, RBs of the uplink BP 2 are numbered 21 to 50, and uplink resources allocated in the uplink scheduling grant are numbered 2 to 12. In this case, the terminal may determine, based on the numbers of the uplink resources allocated in the uplink scheduling grant, that the uplink BP corresponding to the uplink scheduling grant is the uplink BP 1.

In a possible implementation, the indication information may include a time mode, and the time mode represents a correspondence between an activated downlink BP and an activated uplink BP within a specified time period. A time length of the specified time period may be set based on a requirement, for example, may be 5 ms. The correspondence between a downlink BP and an uplink BP may include a correspondence between one or more downlink BPs and one or more uplink BPs. For example, the downlink BP 1 corresponds to the uplink BP 1 and the uplink BP 2. After receiving the time mode, the terminal may determine, within a following specified time period (5 ms), that uplink BPs corresponding to the downlink BP 1 are the uplink BP 1 and the uplink BP 2. After 5 ms, the correspondence between the downlink BP 1 and both the uplink BP 1 and the uplink BP 2 expires.

Step 306: The terminal receives, on the first downlink BP, the indication information sent by the network device.

Step 307: The terminal sends, according to the indication information, an uplink signal on the uplink BP indicated by the indication information.

Step 308: The network device receives the uplink signal sent by the terminal on the uplink BP.

For step 306 to step 308, the terminal receives the indication information, and if the terminal determines that the uplink BP indicated by the indication information includes the first uplink BP corresponding to the uplink scheduling grant in the first downlink BP, the terminal sends uplink scheduling data on the first uplink BP. Correspondingly, the network device receives the uplink scheduling data on the first uplink BP. If the terminal determines that the uplink BP indicated by the indication information includes the second uplink BP corresponding to the HARQ ACK of the downlink data in the first downlink BP, the terminal sends the HARQ ACK of the downlink data on the second uplink BP. Correspondingly, the network device receives the HARQ ACK of the downlink data on the second uplink BP. If the terminal determines that the uplink BP indicated by the indication information includes the first uplink BP corresponding to the uplink scheduling grant in the first downlink BP and the second uplink BP corresponding to the HARQ ACK of the downlink data in the first downlink BP, the terminal sends uplink scheduling data on the first uplink BP, and sends the HARQ ACK of the downlink data on the second uplink BP. Correspondingly, the network device receives the uplink scheduling data on the first uplink BP, and receives the HARQ ACK of the downlink data on the second uplink BP.

In this application, the uplink signal sent by the terminal on the uplink BP indicated by the indication information may be alternatively an SRS. In a time division duplex (Time Division Duplexing, TDD) system, if bandwidth and a frequency domain location of the uplink BP are the same as those of the first downlink BP, the network device may obtain, based on channel reciprocity, channel quality of the first downlink BP based on the SRS sent by the terminal on the uplink BP. However, when the network device configures at least one downlink BP and at least one uplink BP for the terminal, for example, when the first downlink BP corresponds to the uplink BP 1, it is very likely that bandwidth and a frequency domain location of the uplink BP 1 are different from those of the first downlink BP, for example, the bandwidth of the first downlink BP is greater than the bandwidth of the uplink BP 1. Consequently, the network device cannot accurately obtain the channel quality of the first downlink BP based on an SRS received on the uplink BP 1.

Figure 5A:
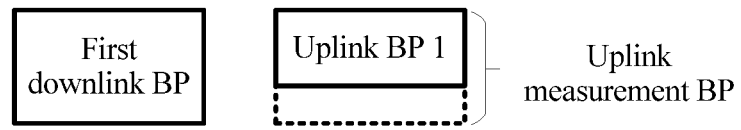
FIG. 5*a* is a schematic diagram of expanding an uplink BP in the first case.
Figure 5B:
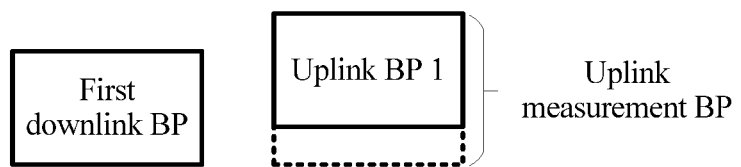
FIG. 5*b* is a schematic diagram of expanding an uplink BP in the second case.

Based on this, in step 307, when there is only one uplink BP, for example, the uplink BP 1, if the terminal determines that the bandwidth of the uplink BP 1 is less than the bandwidth of the first downlink BP, the terminal may expand the uplink BP 1, so that a frequency domain range of the expanded uplink BP and a frequency domain range of the first downlink BP overlap to a largest extent, and the expanded uplink BP is an uplink measurement BP. Optionally, the uplink BP may be expanded in the following manner: If a lowest frequency domain location of the uplink BP is less than or equal to a lowest frequency domain location of the downlink BP, a highest frequency domain location of the uplink BP is increased; or if a highest frequency domain location of the uplink BP is greater than or equal to a highest frequency domain location of the downlink BP, a lowest frequency domain location of the uplink BP is decreased; and maximum bandwidth of the uplink measurement BP is a maximum uplink bandwidth capability of the terminal device. FIG. 5a is a schematic diagram of expanding an uplink BP in the first case, and FIG. 5b is a schematic diagram of expanding an uplink BP in the second case.

When there are two or more uplink BPs, for example, the uplink BP 1 and the uplink BP 2, if the terminal determines that frequency domain ranges of the two or more uplink BPs do not cover a frequency domain range of the first downlink BP, one uplink BP that has a largest overlapping part with the frequency domain range of the first downlink BP may be selected from the two or more uplink BPs, or uplink BPs combining a plurality of frequency domain ranges that have a largest overlapping part with the frequency domain range of the first downlink BP may be selected, and the one uplink BP or the plurality of uplink BPs are expanded, so that a frequency domain range of the expanded uplink measurement BP and the frequency domain range of the first downlink BP overlap to a largest extent, and maximum bandwidth of the expanded uplink measurement BP is a maximum uplink bandwidth capability of the terminal device.

After obtaining the uplink measurement BP, the terminal sends the SRS on the uplink measurement BP. In step 308, after receiving the SRS sent by the terminal on the uplink measurement BP, the network device may obtain the channel quality of the uplink measurement BP. The network device may obtain, based on channel reciprocity, approximate channel quality of the first downlink BP.

It should be noted that, in this application, if the terminal device determines that a difference between the frequency domain range of the first downlink BP and the frequency domain range of the uplink BP corresponding to the first downlink BP is less than a preset threshold, the terminal device may not expand the uplink BP corresponding to the first downlink BP, but directly send the SRS on the uplink BP corresponding to the first downlink BP. In this case, because the difference between the frequency domain range of the first downlink BP and the frequency domain range of the uplink BP corresponding to the first downlink BP is relatively small, the network device may obtain, based on channel reciprocity, the approximate channel quality of the first downlink BP.

Figure 6:
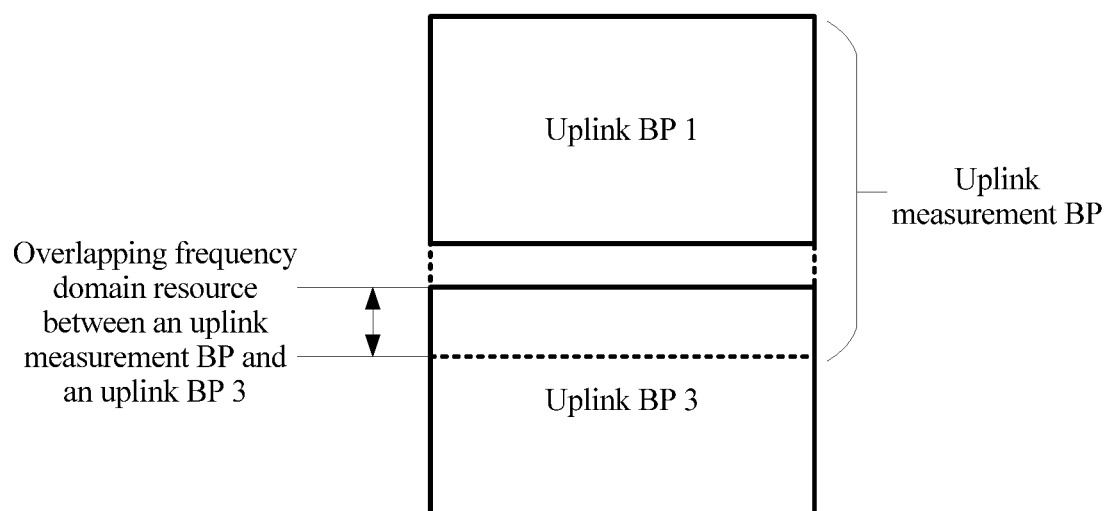
FIG. 6 is a schematic diagram in which an uplink measurement BP and an uplink BP 3 have an overlapping frequency domain resource.

Further, it is considered that the uplink measurement BP may have an overlapping frequency domain resource with another uplink BP. As shown in FIG. 6, an uplink measurement BP and an uplink BP3 have an overlapping frequency domain resource. The uplink BP3 may be an uplink BP activated by the network device for the terminal, or may be an uplink BP activated by the network device for another terminal. Therefore, if the terminal sends the SRS on the uplink measurement BP, and the terminal or the another terminal sends uplink data information and uplink control information on the overlapping frequency domain resource between the uplink BP3 and the uplink measurement BP, interference between signals is caused. Therefore, in this application, priorities of the SRS, the uplink control information, and the uplink data information for occupying the overlapping frequency domain resource between the uplink BP3 and the uplink measurement BP may be set, to avoid the interference between the signals. Specifically, the priority of the uplink control information is higher than the priority of the SRS, and the priority of the SRS is higher than the priority of the uplink data information. Further, a priority of an SRS sent on the uplink BP3 is higher than a priority of an SRS sent on the uplink measurement BP. Therefore, the network device may adjust, based on the specified priorities, occasions on which the terminal sends the SRS, the uplink control information, and the uplink data information.

Figure 7A:
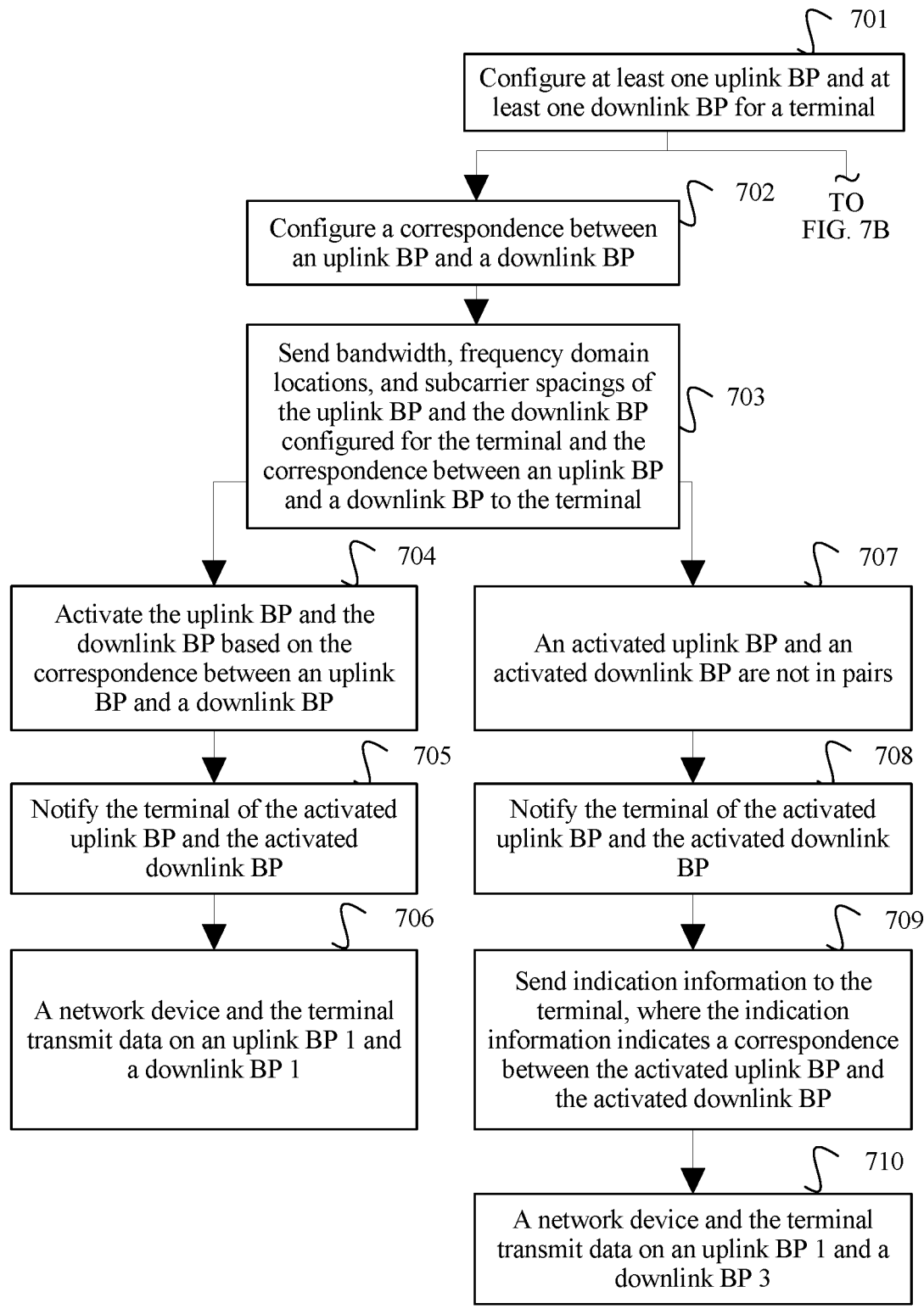
FIG. 7A and FIG. 7B are a schematic diagram of an entire procedure of a communication method according to this application.
Figure 7B:
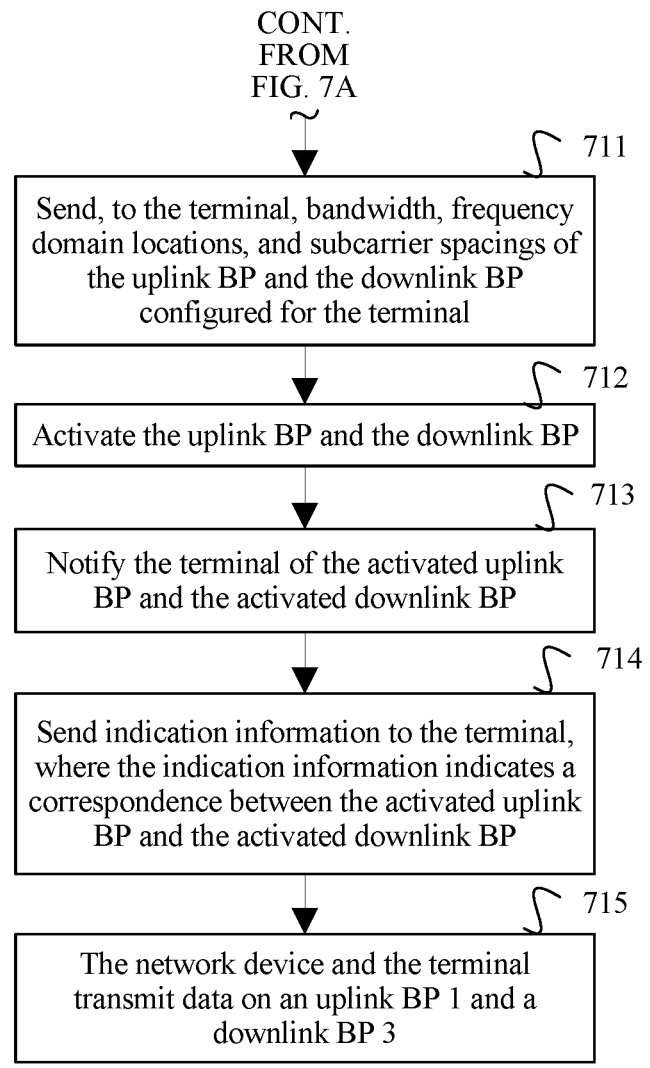

FIG. 7A and FIG. 7B show a communication method according to another embodiment of this application. As shown in FIG. 7A and FIG. 7B, the method includes the following steps.

Step 701: A network device configures at least one uplink BP and at least one downlink BP for a terminal.

For example, the network device configures three uplink BPs (an uplink BP 1, an uplink BP 2, and an uplink BP3) and three downlink BPs (a downlink BP 1, a downlink BP 2, and a downlink BP3) for the terminal.

In this application, the network device configures one or more uplink BPs and one or more downlink BPs for the terminal. In a possible implementation, the network device further configures a correspondence between an uplink BP and a downlink BP. In this case, step 702 is correspondingly performed. For example, at least one first uplink bandwidth part BP associated with a first downlink bandwidth part BP is configured, and/or at least one second downlink BP associated with a second uplink BP is configured. In this case, a base station performs data transmission on the first downlink BP and the at least one first uplink bandwidth part BP associated with the first downlink BP, and/or the base station performs data transmission on the second uplink BP and the at least one second downlink BP associated with the second uplink BP.

In a possible implementation, the network device does not configure the correspondence between an uplink BP and a downlink BP. In this case, step 711 is correspondingly performed.

Step 702: Configure a correspondence between an uplink BP and a downlink BP. The correspondence between an uplink BP and a downlink BP may include any one or any combination of the following: One uplink BP corresponds to one downlink BP; one uplink BP corresponds to a plurality of downlink BPs; a plurality of uplink BPs correspond to one downlink BP; and a plurality of uplink BPs correspond to a plurality of downlink BPs. This is not specifically limited.

For example, the correspondence between an uplink BP and a downlink BP configured by the network device is as follows: The uplink BP 1 corresponds to the downlink BP 1 and the downlink BP 2, and the uplink BP 2 and the uplink BP3 correspond to the downlink BP 3.

Step 703: The network device sends bandwidth, frequency domain locations, and subcarrier spacings of the uplink BP and the downlink BP configured for the terminal device and the correspondence between an uplink BP and a downlink BP to the terminal. Optionally, the network device may send the correspondence between an uplink BP and a downlink BP to the terminal on a common bandwidth part.

In this application, when determining to perform data transmission with the terminal, the network device may activate the uplink BP and the downlink BP for the terminal. Specifically, in step 702, the network device configures the correspondence between an uplink BP and a downlink BP. Therefore, the network device may activate the uplink BP and the downlink BP in pairs based on the correspondence between an uplink BP and a downlink BP. For example, if the uplink BP 1 is associated with the downlink BP 2, both the uplink BP 1 and the downlink BP 2 are activated, and in this case, step 704 is correspondingly performed. Alternatively, the uplink BP and the downlink BP activated by the network device are not in pairs. For example, if the uplink BP 1 is associated with the downlink BP 2, the uplink BP 1 and the downlink BP 1 are activated, and the uplink BP 1 is activated, and in this case, step 707 is correspondingly performed.

Step 704: The network device activates the uplink BP and the downlink BP based on the correspondence between an uplink BP and a downlink BP.

At least one uplink scheduling grant is sent on the first downlink BP, and the uplink grant indicates scheduling information of at least one first uplink BP associated with the first downlink BP. The base station receives uplink data on the first uplink BP. For example, if a downlink BP is associated with two uplink BPs, a scheduling grant may be sent on the downlink BP, and the scheduling grant is shared by the two uplink BPs. The two uplink BPs are numbered together, and one uplink data block may be mapped to two uplink BPs. Alternatively, the downlink BP may include two scheduling grants, the two scheduling grants correspond to different uplink BPs, and one uplink data block is mapped to one uplink BP.

At least one piece of HARQ feedback information is received on the second uplink BP, and the HARQ feedback information corresponds to a HARQ of at least one second downlink BP associated with the second uplink BP. For example, if an uplink BP is associated with two downlink BPs, and one downlink data block is mapped to one downlink BP, HARQ information of the two downlink BPs may be fed back on the uplink BP together; or one downlink data block may be mapped to two downlink BPs, and HARQ information transmitted by the data block is sent on the uplink BP.

The first downlink BP and the first uplink BP associated with the first downlink BP belong to a same serving cell.

Step 705: The network device notifies the terminal of the activated uplink BP and the activated downlink BP. For example, the network device notifies the terminal of the activated uplink BP 1 and the activated downlink BP 1.

Step 706: The network device and the terminal transmit data on the uplink BP 1 and the downlink BP 1.

Step 707: The network device activates the uplink BP and the downlink BP, and the activated uplink BP and the activated downlink BP are not in pairs.

Step 708: The network device notifies the terminal of the activated uplink BP and the activated downlink BP. For example, the network device notifies the terminal of the activated uplink BP 1, the activated uplink BP 2, and the activated downlink BP3.

Step 709: The network device sends indication information to the terminal, where the indication information indicates a correspondence between the activated uplink BP and the activated downlink BP, for example, the indication information indicates that the uplink BP 1 corresponds to the downlink BP3.

Step 710: The network device and the terminal transmit data on the uplink BP 1 and the downlink BP3.

Step 711: The network device sends, to the terminal, bandwidth, frequency domain locations, and subcarrier spacings of the uplink BP and the downlink BP configured for the terminal.

Step 712: The network device activates the uplink BP and the downlink BP, for example, activates the uplink BP 1, the uplink BP 2, and the downlink BP3.

Step 713: The network device notifies the terminal of the activated uplink BP and the activated downlink BP.

Step 714: The network device sends indication information to the terminal, where the indication information indicates a correspondence between the activated uplink BP and the activated downlink BP, for example, the indication information indicates that the uplink BP 1 corresponds to the downlink BP3.

Step 715: The network device and the terminal transmit data on the uplink BP 1 and the downlink BP3.

It should be noted that in a possible implementation, that the network device sends the indication information to the terminal in step 709 and step 714 may be that the terminal device sends the indication information to the terminal on the activated downlink BP. For example, the network device activates the uplink BP 1, the uplink BP 2, and the downlink BP3, and may send the indication information to the terminal on the downlink BP3. In this case, the indication information is used to indicate an uplink BP, and the uplink BP indicated by the indication information is an uplink BP associated with the downlink BP3. For a specific implementation, refer to the foregoing descriptions in FIG. 2 and FIG. 3.

In another possible implementation, the network device may send the indication information to the terminal on the common bandwidth part. The indication information may be RRC information, or may be downlink control information. In this case, the indication information is used to indicate the correspondence between an uplink BP and a downlink BP.

It should be noted that the foregoing method described in this application may be applied to at least a TDD system and a frequency division duplex (Frequency Division Duplexing, FDD) system.

Embodiment 2

In the current system, a network device may instruct, through activation/deactivation, a terminal to switch between a plurality of bandwidth parts, to be specific, the terminal may transmit data on a bandwidth part that is in an activated state, and correspondingly, the terminal may not transmit data on a bandwidth part that is in a deactivated state. The network device may separately configure an uplink bandwidth part and a downlink bandwidth part for the terminal. Correspondingly, the network device separately activates or deactivates the uplink bandwidth part and the downlink bandwidth part for the terminal. If the terminal performs communication in a time division duplex (Time Division Duplexing, TDD) manner, because the network device separately activates or deactivates the uplink bandwidth part and the downlink bandwidth part for the terminal, when the network device separately activates an uplink bandwidth part and a downlink bandwidth part with different center frequencies for the terminal, a transceiver module in the terminal needs to be adjusted to switch between the different center frequencies when the terminal receives data and sends data. Consequently, when the terminal switches between data receiving and data sending, a large amount of time needs to be spent, and working efficiency of the terminal is reduced.

Based on this, Embodiment 2 of this application provides a communication method, to resolve a problem that a terminal needs to switch between different uplink and downlink center frequencies. The method includes: sending, by a network device, configuration information to the terminal, where the configuration information is used to configure a first frequency domain resource and a frequency domain resource associated with the first frequency domain resource; and correspondingly, receiving, by the terminal, the configuration information from the network device, and configuring the first frequency domain resource and the frequency domain resource associated with the first frequency domain resource. In this way, because the first frequency domain resource and the frequency domain resource associated with the first frequency domain resource have a same center frequency, and the first frequency domain resource and the frequency domain resource associated with the first frequency domain resource are in different transmission directions, the terminal can subsequently perform data transmission with the network device by using the first frequency domain resource and the frequency domain resource associated with the first frequency domain resource without a need to switch between different center frequencies.

In this application, the frequency domain resource may be specifically a bandwidth part, namely, a BP or a BWP. The transmission directions include an uplink transmission direction and a downlink transmission direction. A frequency domain resource used for downlink transmission is a downlink frequency domain resource, and a frequency domain resource used for uplink transmission is an uplink frequency domain resource. The terminal may support simultaneous activation of a plurality of frequency domain resources in one transmission direction, or may support simultaneous activation of only one frequency domain resource in one transmission direction. An example in which the terminal supports simultaneous activation of only one frequency domain resource in one transmission direction is used below for description.

The network device may send the configuration information to the terminal in a plurality of manners, for example, the configuration information is carried by signaling or a message. For example, the network device may send the configuration information by using RRC signaling or DCI. The configuration information may include an association relationship between a plurality of uplink frequency domain resources and a plurality of downlink frequency domain resources. One uplink frequency domain resource may be associated with one downlink frequency domain resource, or may be associated with a plurality of downlink frequency domain resources. Similarly, one downlink frequency domain resource may be associated with one uplink frequency domain resource, or may be associated with a plurality of downlink frequency domain resources. The association relationship may be represented in a plurality of forms, for example, by using a data table, as shown in Table 1.

TABLE 1

Example of an association relationship

| Identifier of an uplink frequency domain resource | Identifier of a downlink frequency domain resource |
|---|---|
| Uplink frequency domain resource 1 | Downlink frequency domain resource 1 |
| Uplink frequency domain resource 2 | Downlink frequency domain resource 2 |
| Uplink frequency domain resource 3 | |
| . . . | . . . |
| Uplink frequency domain resource N | Downlink frequency domain resource M1 |
| | . . . |
| | Downlink frequency domain resource Mk |

It may be learned from Table 1 that the uplink frequency domain resource 1 and the downlink frequency domain resource 1 are a group of associated frequency domain resources; the uplink frequency domain resource 2, the uplink frequency domain resource 3, and the downlink frequency domain resource 3 are a group of associated frequency domain resources; and the uplink frequency domain resource N and the downlink frequency domain resource M1, . . . , and the downlink frequency domain resource Mk are a group of associated frequency domain resources. Each group of associated frequency domain resources have a same center frequency.

If the first frequency domain resource is an uplink frequency domain resource, the first frequency domain resource may be any uplink frequency domain resource in Table 1. If the first frequency domain resource is a downlink frequency domain resource, the first frequency domain resource may be any downlink frequency domain resource in Table 1. For example, the first frequency domain resource is the downlink frequency domain resource 1, and correspondingly, the frequency domain resource associated with the first frequency domain resource is the uplink frequency domain resource 1. There may be one frequency domain resource associated with the first frequency domain resource, or a plurality of frequency domain resources associated with the first frequency domain resource. These two possible cases are separately described in detail below.

Case 1: One frequency domain resource, to be specific, a second frequency domain resource, is associated with the first frequency domain resource.

Figure 8:
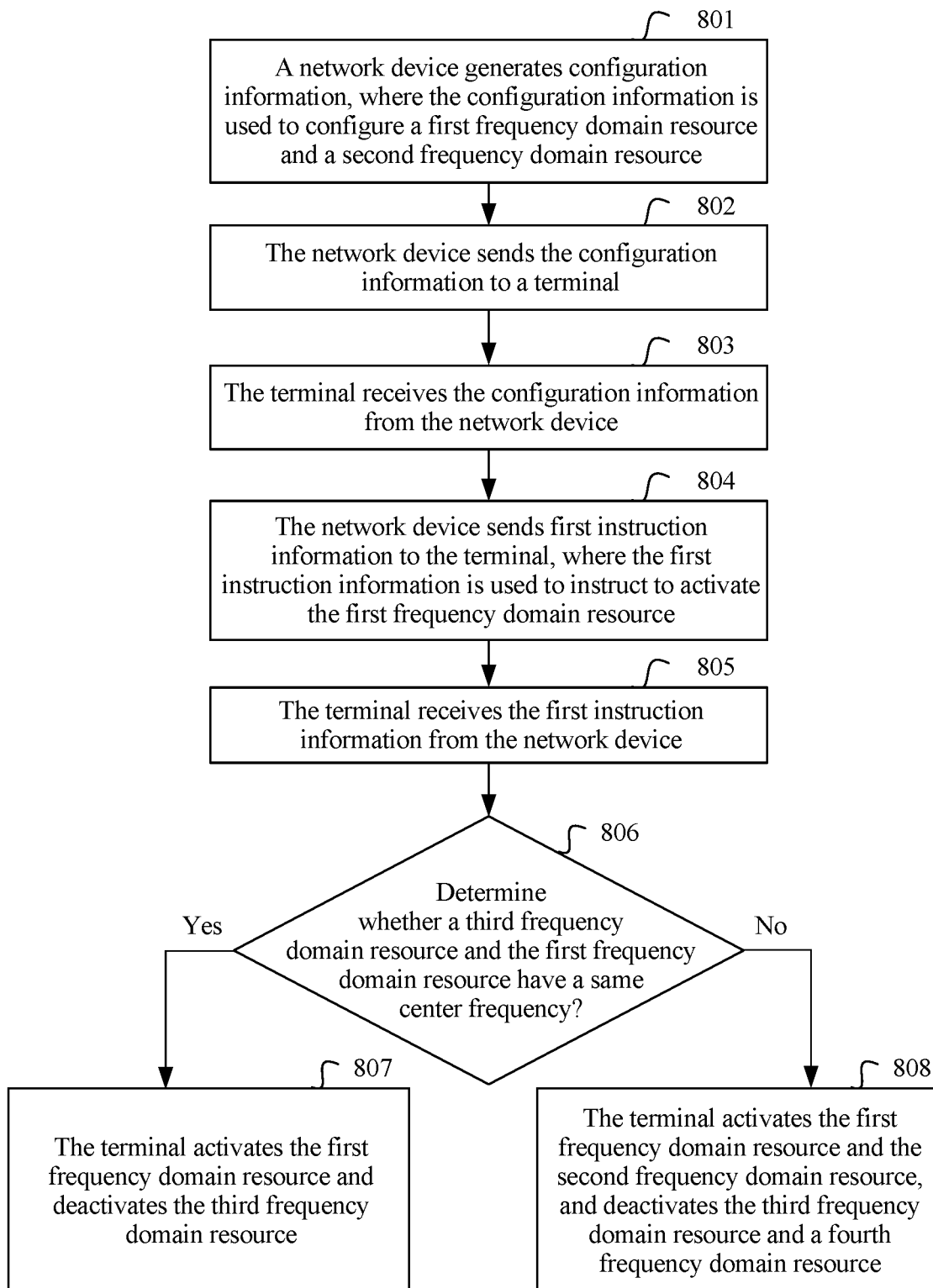
FIG. 8 is a schematic flowchart corresponding to Case 1 of this application.

FIG. 8 is a schematic flowchart corresponding to Case 1. As shown in FIG. 8, the method includes the following steps.

Step 801: The network device generates configuration information, where the configuration information is used to configure a first frequency domain resource and a second frequency domain resource.

Step 802: The network device sends the configuration information to the terminal.

Step 803: The terminal receives the configuration information from the network device.

Step 804: The network device sends first instruction information to the terminal, where the first instruction information is used to instruct to activate the first frequency domain resource.

Step 805: The terminal receives the first instruction information from the network device.

Step 806: If the terminal determines that there are an activated third frequency domain resource and an activated fourth frequency domain resource, the terminal determines whether the third frequency domain resource and the first frequency domain resource have a same center frequency. If the third frequency domain resource and the first frequency domain resource have a same center frequency, step 807 is performed; or if the third frequency domain resource and the first frequency domain resource do not have a same center frequency, step 808 is performed.

The third frequency domain resource and the first frequency domain resource are in a same transmission direction, the third frequency domain resource and the fourth frequency domain resource are in different transmission directions, and the third frequency domain resource and the fourth frequency domain resource have a same center frequency.

Step 807: The terminal activates the first frequency domain resource and deactivates the third frequency domain resource.

In this case, the terminal may perform data transmission with the network device by using the activated first frequency domain resource and the activated fourth frequency domain resource.

Step 808: The terminal activates the first frequency domain resource and the second frequency domain resource, and deactivates the third frequency domain resource and the fourth frequency domain resource.

In this case, the terminal may perform data transmission with the network device by using the activated first frequency domain resource and the activated second frequency domain resource.

It should be noted that the foregoing descriptions and step numbers are merely an example of an execution procedure of this application, and are not specifically limited.

Case 2: A plurality of frequency domain resources are associated with the first frequency domain resource.

Figure 9A:
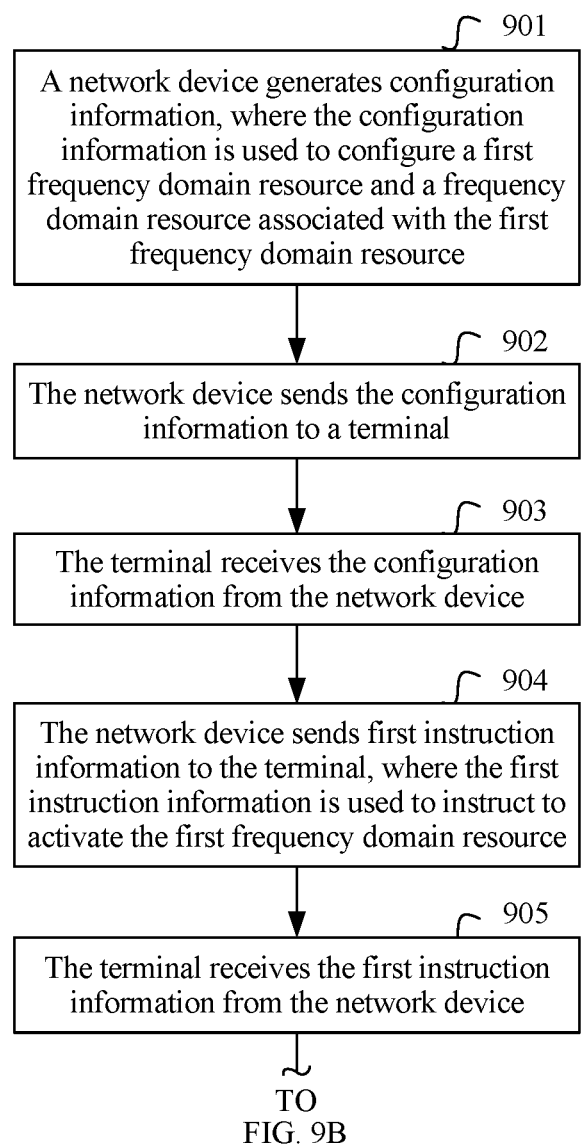
FIG. 9A and FIG. 9B are a schematic flowchart corresponding to Case 2 of this application.
Figure 9B:
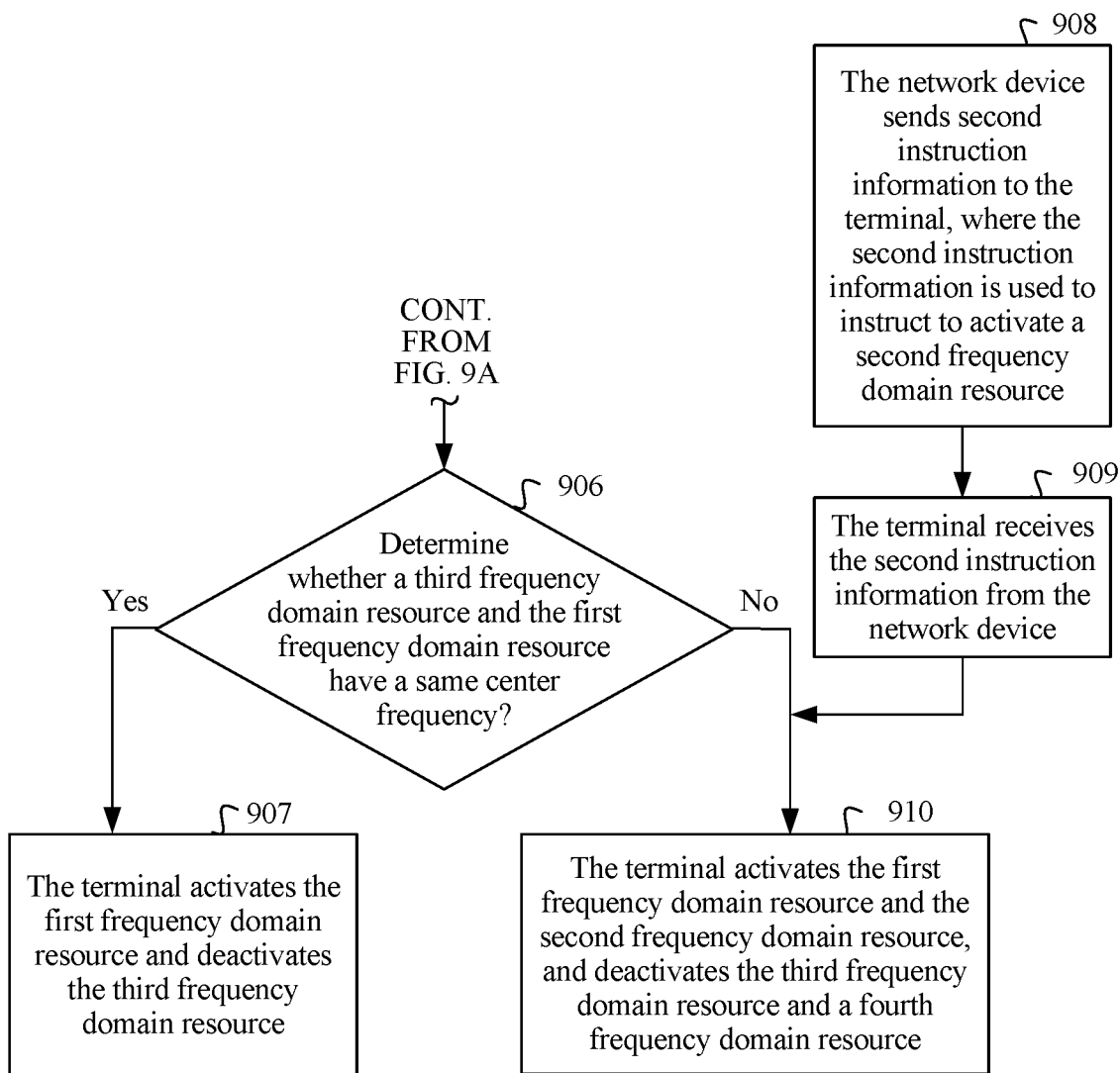

FIG. 9A and FIG. 9B are a schematic flowchart corresponding to Case 2. As shown in FIG. 9A and FIG. 9B, the method includes the following steps.

Step 901: The network device generates configuration information, where the configuration information is used to configure a first frequency domain resource and a frequency domain resource associated with the first frequency domain resource.

Step 902: The network device sends the configuration information to the terminal.

Step 903: The terminal receives the configuration information from the network device.

Step 904: The network device sends first instruction information to the terminal, where the first instruction information is used to instruct to activate the first frequency domain resource.

Step 905: The terminal receives the first instruction information from the network device.

Step 906: If the terminal determines that there are an activated third frequency domain resource and an activated fourth frequency domain resource, the terminal determines whether the third frequency domain resource and the first frequency domain resource have a same center frequency. If the third frequency domain resource and the first frequency domain resource have a same center frequency, step 907 is performed; or if the third frequency domain resource and the first frequency domain resource do not have a same center frequency, step 910 is performed.

The third frequency domain resource and the first frequency domain resource are in a same transmission direction, the third frequency domain resource and the fourth frequency domain resource are in different transmission directions, and the third frequency domain resource and the fourth frequency domain resource have a same center frequency.

Step 907: The terminal activates the first frequency domain resource and deactivates the third frequency domain resource.

In this case, the terminal may perform data transmission with the network device by using the activated first frequency domain resource and the activated fourth frequency domain resource.

Step 908: The network device sends second instruction information to the terminal, where the second instruction information is used to instruct to activate a second frequency domain resource.

Step 909: The terminal receives the second instruction information from the network device.

Step 910: The terminal activates the first frequency domain resource and the second frequency domain resource, and deactivates the third frequency domain resource and the fourth frequency domain resource.

In this case, the terminal may perform data transmission with the network device by using the activated first frequency domain resource and the activated second frequency domain resource.

In this case, because there are the plurality of frequency domain resources associated with the first frequency domain resource, a base station needs to give an instruction by using the second instruction information, and the base station may give the instruction based on a scheduling requirement of the base station. Therefore, scheduling flexibility is further improved, and spectrum efficiency of a system is improved.

It should be noted that: (1) The foregoing descriptions and step numbers are merely an example of an execution procedure of this application, and are not specifically limited. For example, step 908 and step 909 may be alternatively performed before step 907. In this case, because the terminal determines that the frequency domain resource associated with the first frequency domain resource does not need to be activated, the second instruction information may be ignored. (2) In this application, an identifier of the frequency domain resource may be a number of the frequency domain resource. In step 910, the terminal may directly activate, based on numbers of the frequency domain resources associated with the first frequency domain resource, a frequency domain resource (for example, the second frequency domain resource) with a minimum number. In this case, the network device does not need to send the second instruction information to the terminal.

In the foregoing procedures described in FIG. 8 and FIG. 9A and FIG. 9B, after sending the configuration information to the terminal, the network device needs to send the first instruction information (and the second instruction information) to the terminal to instruct the terminal to activate a corresponding frequency domain resource. In this application, alternatively, frequency domain resources that are activated by default may be predefined in the configuration information. For example, the frequency domain resources that are activated by default are the first frequency domain resource and the frequency domain resource associated with the first frequency domain resource. If a plurality of frequency domain resources are associated with the first frequency domain resource, one of the plurality of frequency domain resources may be predefined as the frequency domain resource that is activated by default. In this way, after receiving the configuration information, the terminal directly activates the first frequency domain resource and the frequency domain resources associated with the first frequency domain resource. Specifically, after receiving the configuration information, the terminal may immediately activate the first frequency domain resource and the frequency domain resources associated with the first frequency domain resource, or the terminal may activate the first frequency domain resource and the frequency domain resources associated with the first frequency domain resource after waiting for specified duration after the configuration information is received, or the terminal may activate the first frequency domain resource and the frequency domain resources associated with the first frequency domain resource based on a specified period.

Embodiment 3

Embodiment 3 of this application provides a communication method. The method includes: receiving, by a terminal, third instruction information from a network device, where the third instruction information is used to instruct to activate a first frequency domain resource pair; and activating, by the terminal, the first frequency domain resource pair according to the third instruction information. The first frequency domain resource pair includes an uplink frequency domain resource and a downlink frequency domain resource that are associated with each other, so that the uplink frequency domain resource and the downlink frequency domain resource can be jointly activated, thereby effectively simplifying a signaling design.

In this application, the frequency domain resource may be specifically a bandwidth part, namely, a BP or a BWP. Transmission directions include an uplink transmission direction and a downlink transmission direction. A frequency domain resource used for downlink transmission is a downlink frequency domain resource, and a frequency domain resource used for uplink transmission is an uplink frequency domain resource. The uplink frequency domain resource and the downlink frequency domain resource that are associated with each other form one frequency domain resource pair. Specifically, one frequency domain resource pair may include one uplink frequency domain resource and a plurality of downlink frequency domain resources, or may include a plurality of uplink frequency domain resources and one downlink frequency domain resource, or may include a plurality of uplink frequency domain resources and a plurality of downlink frequency domain resources, or may include one uplink frequency domain resource and one downlink frequency domain resource. This is not specifically limited. The terminal may support simultaneous activation of a plurality of frequency domain resource pairs, or may support simultaneous activation of only one frequency domain resource pair. An example in which the terminal supports simultaneous activation of only one frequency domain resource pair is used below for description.

Figure 10:
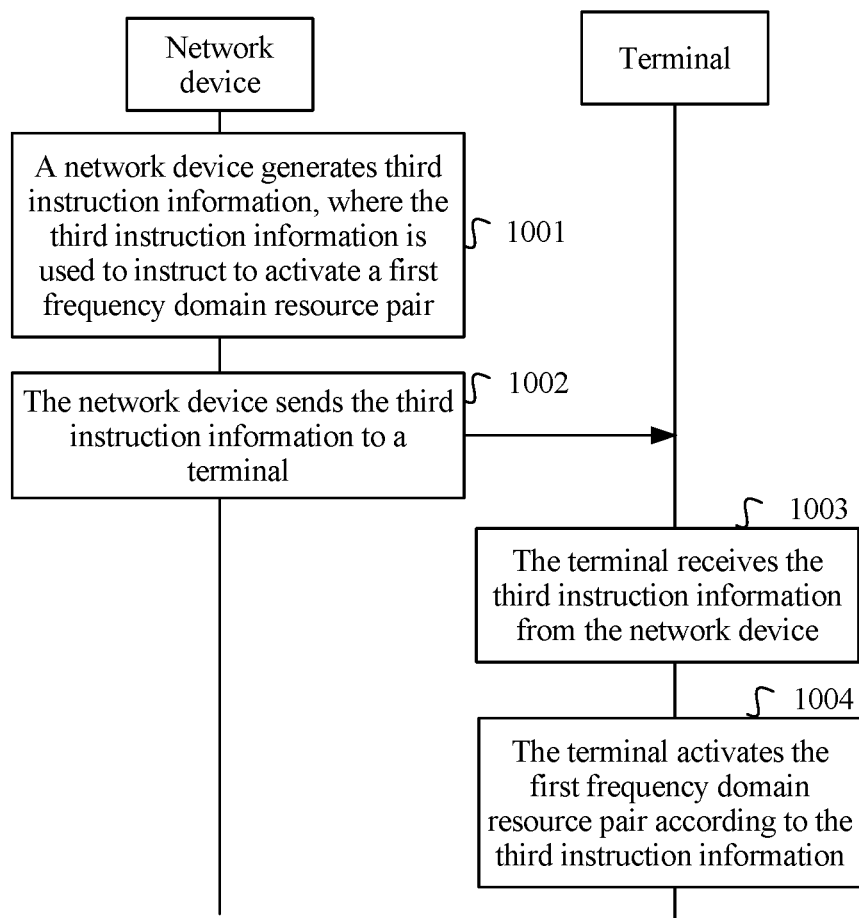
FIG. 10 is a schematic flowchart corresponding to a communication method according to Embodiment 3 of this application.

FIG. 10 is a schematic flowchart corresponding to a communication method according to this application. As shown in FIG. 10, the method includes the following steps.

Step 1001: A network device generates third instruction information, where the third instruction information is used to instruct to activate a first frequency domain resource pair, and the first frequency domain resource pair includes an uplink frequency domain resource and a downlink frequency domain resource that are associated with each other.

The third instruction information may include an identifier of the first frequency domain resource pair, and the identifier of the first frequency domain resource pair may be a number of the first frequency domain resource pair or other information used to uniquely identify the first frequency domain resource pair. This is not specifically limited.

Step 1002: The network device sends the third instruction information to a terminal.

Herein, the network device may send the third instruction information in a plurality of manners, for example, send the third instruction information by using downlink control information (downlink control information, DCI), where the DCI may be DCI used for scheduling downlink data, or may be DCI used for scheduling uplink data.

Step 1003: The terminal receives the third instruction information from the network device.

Herein, after receiving the third instruction information, the terminal obtains the identifier of the first frequency domain resource pair through parsing.

Step 1004: The terminal activates the first frequency domain resource pair according to the third instruction information.

Herein, the terminal activates the uplink frequency domain resource and the downlink frequency domain resource in the first frequency domain resource pair, and performs data transmission with the network device by using the activated uplink frequency domain resource and the activated downlink frequency domain resource.

In this application, the network device and the terminal in the foregoing step procedure store an identifier of at least one frequency domain resource pair and identifiers of frequency domain resources in the at least one frequency domain resource pair. The first frequency domain resource pair is any one or more of the at least one frequency domain resource pair. In a first possible implementation, the network device may configure the at least one frequency domain resource pair, and send configuration information to the terminal, and the configuration information is used to configure the at least one frequency domain resource pair; and correspondingly, the terminal determines the at least one frequency domain resource pair based on the configuration information. In a second possible implementation, the at least one frequency domain resource pair may be preconfigured in the network device and the terminal by using a protocol. Further, frequency domain resources in each frequency domain resource pair may have a same center frequency, so that the terminal is effectively prevented from switching between different uplink and downlink center frequencies.

Further, after step 1003, the method further includes: deactivating, by the terminal, a second frequency domain resource pair, where the second frequency domain resource pair is an activated frequency domain resource pair in the at least one frequency domain resource pair except the first frequency domain resource pair. In other words, because the terminal supports simultaneous activation of only one frequency domain resource pair, before the terminal activates the first frequency domain resource pair, if it is determined that there is the activated second frequency domain resource pair, the terminal needs to deactivate the second frequency domain resource pair.

A possible complete procedure of a communication method according to this application is described below with reference to FIG. 11. As shown in FIG. 1i, the method includes the following steps.

Step 1101: A network device configures a plurality of frequency domain resource pairs, and sends configuration information to a terminal, where the configuration information is used to configure the plurality of frequency domain resource pairs.

The network device may send the configuration information to the terminal in a plurality of manners, for example, the configuration information is carried by signaling or a message. For example, the network device may send the configuration information by using RRC signaling or DCI. The configuration information may include identifiers of the plurality of frequency domain resource pairs and identifiers of frequency domain resources in the plurality of frequency domain resource pairs. Table 2 is an example of the configuration information.

TABLE 2

Example of configuration information

| Identifier of a frequency domain resource pair | Identifier of an uplink frequency domain resource | Identifier of a downlink frequency domain resource |
|---|---|---|
| 1 | Uplink frequency domain resource 1 | Downlink frequency domain resource 1 |
| 2 | Uplink frequency domain resource 2 | Downlink frequency domain resource 2 |
|   | Uplink frequency domain resource 3 |   |
| . . . | . . . | . . . |
| P | Uplink frequency domain resource N | Downlink frequency domain resource M1 |
|   |   | . . . |
|   |   | Downlink frequency domain resource Mk |

It may be learned from Table 2 that the uplink frequency domain resource 1 and the downlink frequency domain resource 1 are a group of associated frequency domain resources, and form a frequency domain resource pair; the uplink frequency domain resource 2, the uplink frequency domain resource 3, and the downlink frequency domain resource 3 are a group of associated frequency domain resources, and form a frequency domain resource pair; and the uplink frequency domain resource N and the downlink frequency domain resource M1, . . . , and the downlink frequency domain resource Mk are a group of associated frequency domain resources, and form a frequency domain resource pair.

Step 1102: The terminal receives the configuration information, and determines the plurality of frequency domain resource pairs based on the configuration information.

Step 1103: The network device generates third instruction information, and sends the third instruction information to the terminal. The third instruction information is used to instruct to activate a first frequency domain resource pair, and the first frequency domain resource pair is any one of the plurality of frequency domain resource pairs. The third instruction information may include an identifier of the first frequency domain resource pair.

Step 1104: The network device generates fourth instruction information, and sends the fourth instruction information to the terminal, where the fourth instruction information is used to instruct to deactivate a second frequency domain resource pair, and the second frequency domain resource pair is an activated frequency domain resource pair in the plurality of frequency domain resource pairs except the first frequency domain resource pair. The fourth instruction information may include an identifier of the second frequency domain resource pair.

Step 1105: The terminal receives the third instruction information and the fourth instruction information from the network device, deactivates the second frequency domain resource pair according to the fourth instruction information, and activates the first frequency domain resource pair according to the third instruction information.

It should be noted that the foregoing step numbers are only an example of an execution procedure. For example, in another implementation, step 1104 may be performed before step 1103, or step 1104 and step 1103 may be simultaneously performed. This is not specifically limited.

Figure 11:
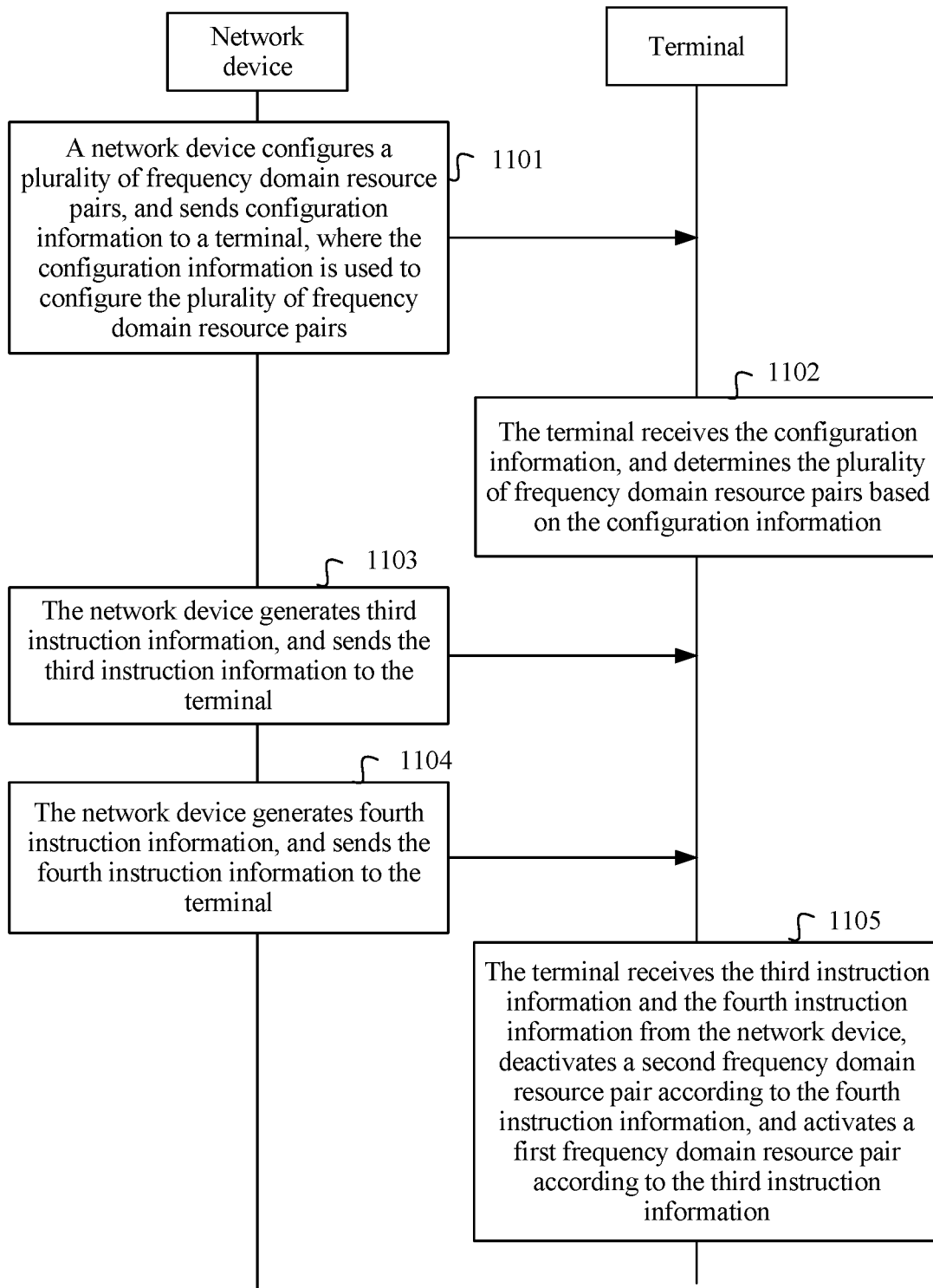
FIG. 11 is a schematic diagram of a possible complete procedure of a communication method according to Embodiment 3 of this application.

It may be learned from the foregoing procedures described in FIG. 10 and FIG. 11 that before activating the first frequency domain resource pair according to the third instruction information, the terminal may deactivate the second frequency domain resource pair by receiving the fourth instruction information sent by the network device, or may directly deactivate the second frequency domain resource pair. This is not specifically limited.

It should be noted that in another possible implementation, the network device may send only deactivation instruction information to the terminal to instruct the terminal to deactivate a corresponding frequency domain resource pair, to jointly deactivate the uplink frequency domain resource and the downlink frequency domain resource.

Figure 12:
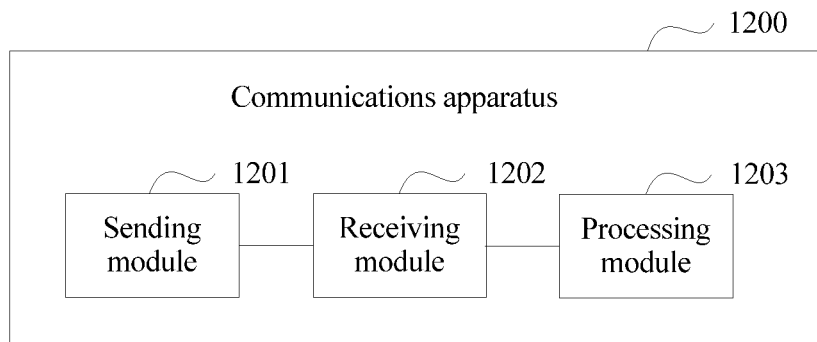
FIG. 12 is a schematic structural diagram of a first type of communications apparatus according to this application.

Based on Embodiment 1, this application provides a first type of communications apparatus. The communications apparatus may be a network device, or may be a chip in the network device, and is configured to implement corresponding procedures or steps in the method embodiments shown in FIG. 2, FIG. 3, and FIG. 7A and FIG. 7B. Referring to FIG. 12, a communications apparatus 1200 may include a sending module 1201, a receiving module 1202, and a processing module 1203. Specifically, the processing module 1203, the sending module 1201, and the receiving module 1202 perform the following steps together: sending indication information to a terminal, where the indication information is used to indicate at least one second BP associated with a first BP; and performing signal transmission with the terminal on the first BP and the at least one second BP.

Figure 13:
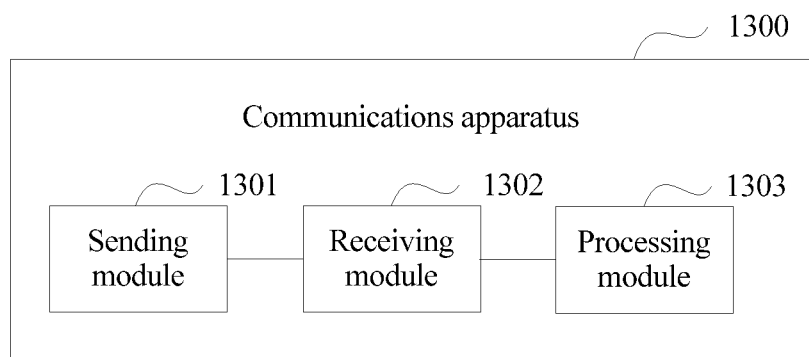
FIG. 13 is a schematic structural diagram of a second type of communications apparatus according to this application.

Based on Embodiment 1, this application provides a second type of communications apparatus. The communications apparatus may be a terminal, or may be a chip in the terminal, and is configured to implement corresponding procedures or steps in the method embodiments shown in FIG. 2, FIG. 3, and FIG. 7A and FIG. 7B. Referring to FIG. 13, a communications apparatus 1300 may include a sending module 1301, a receiving module 1302, and a processing module 1303. Specifically, the processing module 1303, the sending module 1301, and the receiving module 1302 perform the following steps together:

receiving indication information sent by a network device, where the indication information is used to indicate at least one second BP associated with a first BP; and performing signal transmission with the network device on the first BP and the at least one second BP.

Based on Embodiment 2, this application provides a communications apparatus. The communications apparatus may be a network device, or may be a terminal, and is configured to implement corresponding procedures or steps in the method embodiments shown in FIG. 8 and FIG. 9A and FIG. 9B. The communications apparatus may include corresponding function modules, configured to perform the method procedure described in Embodiment 2, for example, may include a sending module, a receiving module, and a processing module.

Based on Embodiment 3, this application provides a communications apparatus. The communications apparatus may be a network device, or may be a terminal, and is configured to implement corresponding procedures or steps in the method embodiments shown in FIG. 10 and FIG. 11. The communications apparatus may include corresponding function modules, configured to perform the method procedure described in Embodiment 3, for example, may include a sending module, a receiving module, and a processing module.

It should be noted that module division in the embodiments of this application is an example and is merely logical function division. During actual implementation, there may be another division manner. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the current system, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Figure 14:
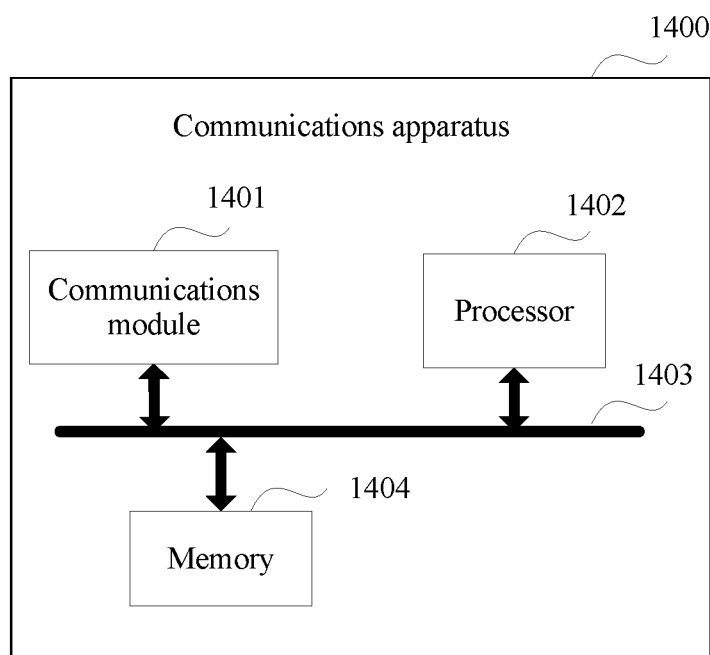
FIG. 14 is a schematic structural diagram of a third type of communications apparatus according to this application.

Based on Embodiment 1, an embodiment of this application provides a third type of communications apparatus. The communications apparatus may be a network device, or may be a chip in the network device, and is configured to implement corresponding procedures or steps in the method embodiments shown in FIG. 2, FIG. 3, and FIG. 7A and FIG. 7B. The communications apparatus has a function of the communications apparatus 1200 shown in FIG. 12. Referring to FIG. 14, the communications apparatus 1400 includes a communications module 1401, a processor 1402, a bus 1403, and a memory 1404.

The communications module 1401 is configured to communicate and interact with another device, specifically, is configured to: send indication information to a terminal, where the indication information is used to indicate at least one second BP associated with a first BP; and perform signal transmission with the terminal on the first BP and the at least one second BP.

The communications module 1401 may be an RF circuit, a Wi-Fi module, a communications interface, a Bluetooth module, or the like.

The processor 1402 is configured to implement a function of the processing module 1203 in FIG. 12, for example, determining the indication information.

Optionally, the communications apparatus 1400 may further include the memory 1404, configured to store a program and the like. Specifically, the program may include program code, and the program code includes an instruction. The memory 1404 may include a RAM, and may further include a non-transitory storage (non-transitory memory), for example, at least one magnetic disk memory. The processor 1402 executes an application program stored in the memory 1404, to implement the foregoing function.

Figure 15:
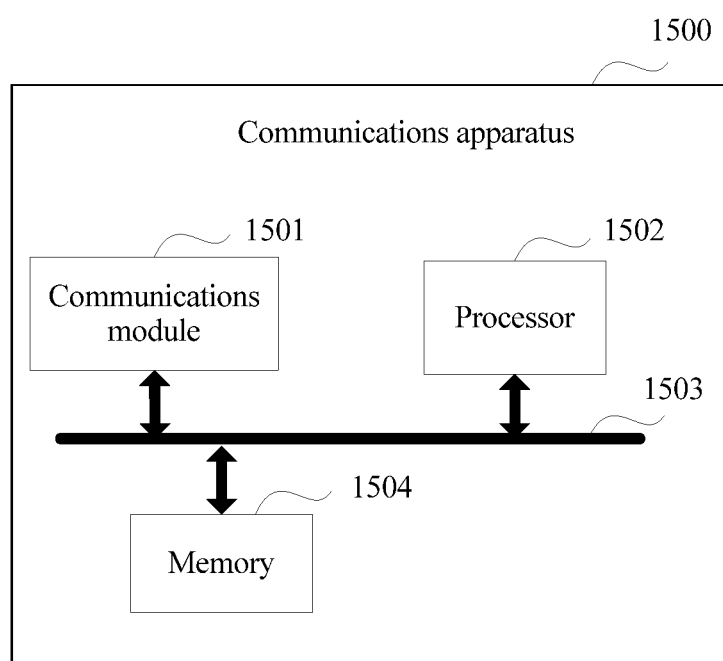
FIG. 15 is a schematic structural diagram of a fourth type of communications apparatus according to this application.

Based on Embodiment 1, an embodiment of this application provides a fourth type of communications apparatus. The communications apparatus may be a terminal, or may be a chip in the terminal, and is configured to implement corresponding procedures or steps in the method embodiments shown in FIG. 2, FIG. 3, and FIG. 7A and FIG. 7B. The communications apparatus has a function of the communications apparatus 1300 shown in FIG. 13. Referring to FIG. 15, the communications apparatus 1500 includes a communications module 1501, a processor 1502, a bus 1503, and a memory 1504.

The communications module 1501 is configured to communicate and interact with another device, specifically, is configured to: receive indication information sent by a network device, where the indication information is used to indicate at least one second BP associated with a first BP; and perform signal transmission with the network device on the first BP and the at least one second BP.

The communications module 1501 may be an RF circuit, a Wi-Fi module, a communications interface, a Bluetooth module, or the like.

The processor 1502 is configured to implement a function of the processing module 1303 in FIG. 13, for example, parsing the indication information.

Optionally, the communications apparatus 1500 may further include the memory 1504, configured to store a program and the like. Specifically, the program may include program code, and the program code includes an instruction. The memory 1504 may include a RAM, and may further include a non-transitory storage (non-transitory memory), for example, at least one magnetic disk memory. The processor 1502 executes an application program stored in the memory 1504, to implement the foregoing function.

Based on Embodiment 2 and Embodiment 3, an embodiment of this application provides a communications apparatus. The communications apparatus may be a terminal or a network device, and is configured to implement corresponding procedure or steps in the method embodiment shown in FIG. 8, FIG. 9A and FIG. 9B, FIG. 10, or FIG. 11. The communications apparatus includes a communications module and a processor.

The communications module is configured to communicate and interact with another device. The communications module may be an RF circuit, a Wi-Fi module, a communications interface, a Bluetooth module, or the like.

The processor is configured to implement a function of the processing module.

Optionally, the communications apparatus may further include a memory, configured to store a program and the like. Specifically, the program may include program code, and the program code includes an instruction. The memory may include a RAM, and may further include a non-transitory storage (e.g., non-transitory memory), for example, at least one magnetic disk memory. The processor executes the application program stored in the memory, to implement the foregoing function.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instruction may be stored in a computer-readable storage medium or transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Obviously, a person skilled in the art can make various modifications and variations to the embodiments of the present invention without departing from the spirit and scope of this application. This application is intended to cover these modifications and variations provided that they fall within the scope of protection defined by the following claims and their equivalent technologies.

What is claimed is:

1. A method, comprising:
receiving, by a terminal, indication information from a network device, wherein the indication information indicates to activate a first frequency domain resource pair comprising an uplink frequency domain resource and a downlink frequency domain resource, wherein the uplink frequency domain resource is associated with the downlink frequency domain resource, wherein the uplink frequency domain resource and the downlink frequency domain resource have a same center frequency, wherein the uplink frequency domain resource and the downlink frequency domain resource are bandwidth parts on a carrier, wherein the bandwidth parts each have a bandwidth that is smaller than a bandwidth of the carrier, and wherein the first frequency domain resource pair is in a deactivated state when the indication information is received; and
activating the first frequency domain resource pair according to the indication information.

2. The method according to claim 1, further comprising:
receiving configuration information from the network device, wherein the configuration information configures at least one frequency domain resource pair, and the first frequency domain resource pair is one of the at least one frequency domain resource pair; and
determining the at least one frequency domain resource pair according to the configuration information.

3. The method according to claim 2, further comprising:
deactivating a second frequency domain resource pair, wherein the second frequency domain resource pair is an activated frequency domain resource pair in the at least one frequency domain resource pair, and the second frequency domain resource pair is different from the first frequency domain resource pair.

4. The method according to claim 1, wherein the indication information comprises an identifier of the first frequency domain resource pair.

5. The method according to claim 1, wherein the uplink frequency domain resource is an uplink bandwidth part and the downlink frequency domain resource is a downlink bandwidth part.

6. The method according to claim 1, wherein the indication information is from the network device on the downlink frequency domain resource.

7. An apparatus, comprising:
a non-transitory memory storage comprising instructions; and
one or more processors coupled with the non-transitory memory storage, wherein the one or more processors are configured to execute the instructions to control the apparatus to:
receive indication information from a network device, wherein the indication information indicates to activate a first frequency domain resource pair comprising an uplink frequency domain resource and a downlink frequency domain resource, wherein the uplink frequency domain resource is associated with the downlink frequency domain resource, wherein the uplink frequency domain resource and the downlink frequency domain resource have a same center frequency, wherein the uplink frequency domain resource and the downlink frequency domain resource are bandwidth parts on a carrier, wherein the bandwidth pails each have a bandwidth that is smaller than a bandwidth of the carrier, and wherein the first frequency domain resource pair is in a deactivated state when the indication information is received; and
activate the first frequency domain resource pair according to the indication information.

8. The apparatus according to claim 7, wherein the one or more processors are configured to further execute the instructions to control the apparatus to:
receive configuration information from the network device, wherein the configuration information configures at least one frequency domain resource pair, and the first frequency domain resource pair is one of the at least one frequency domain resource pair; and
determine the at least one frequency domain resource pair according to the configuration information.

9. The apparatus according to claim 8, wherein the one or more processors are configured to further execute the instructions to control the apparatus to:
deactivate a second frequency domain resource pair, wherein the second frequency domain resource pair is an activated frequency domain resource pair in the at least one frequency domain resource pair, and the second frequency domain resource pair is different from the first frequency domain resource pair.

10. The apparatus according to claim 7, wherein the indication information comprises an identifier of the first frequency domain resource pair.

11. The apparatus according to claim 7, wherein the uplink frequency domain resource is an uplink bandwidth part and the downlink frequency domain resource is a downlink bandwidth part.

12. The apparatus according to claim 7, wherein the indication information is from the network device on the downlink frequency domain resource.

13. A non-transitory computer readable medium, wherein the non-transitory computer readable medium stores instructions that are executable by a computer, and the instructions comprise instructions for:
receiving indication information from a network device, wherein the indication information indicates to activate a first frequency domain resource pair comprising an uplink frequency domain resource and a downlink frequency domain resource, wherein the uplink frequency domain resource is associated with the downlink frequency domain resource, the uplink frequency domain resource and the downlink frequency domain resource have a same center frequency, wherein the uplink frequency domain resource and the downlink frequency domain resource are bandwidth parts on a carrier, wherein the bandwidth parts each have a bandwidth that is smaller than a bandwidth of the carrier, and wherein the first frequency domain resource pair is in a deactivated state when the indication information is received; and
activating the first frequency domain resource pair according to the indication information.

14. The non-transitory computer readable medium according to claim 13, wherein the instructions further comprise instructions for:
- receiving configuration information from the network device, wherein the configuration information configures at least one frequency domain resource pair, and the first frequency domain resource pair is one of the at least one frequency domain resource pair; and
- determining the at least one frequency domain resource pair according to the configuration information.

15. The non-transitory computer readable medium according to claim 14, wherein the instructions further comprise instructions for:
- deactivating a second frequency domain resource pair, wherein the second frequency domain resource pair is an activated frequency domain resource pair in the at least one frequency domain resource pair, and the second frequency domain resource pair is different from the first frequency domain resource pair.

16. The non-transitory computer readable medium according to claim 13, wherein the indication information comprises an identifier of the first frequency domain resource pair.

17. The non-transitory computer readable medium according to claim 13, wherein the uplink frequency domain resource is an uplink bandwidth part and the downlink frequency domain resource is a downlink bandwidth part.

18. The non-transitory computer readable medium according to claim 13, wherein the indication information is from the network device on the downlink frequency domain resource.

* * * * *